(12) United States Patent
Matsuyama et al.

(10) Patent No.: US 6,469,765 B1
(45) Date of Patent: Oct. 22, 2002

(54) LIQUID CRYSTAL DISPLAY AND METHOD OF PERFORMING DISPLAY OPERATION

(75) Inventors: Hiroaki Matsuyama; Yoshihiko Hirai; Kazumi Kobayashi; Yuji Yamamoto; Mamoru Okamoto; Michiaki Sakamoto; Shinichi Nakata, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/592,199

(22) Filed: Jun. 13, 2000

(30) Foreign Application Priority Data

Jun. 16, 1999 (JP) .......................................... 11-169582

(51) Int. Cl.$^7$ ............................................ G02F 1/1343
(52) U.S. Cl. ...................................... 349/143; 349/141
(58) Field of Search ................................... 349/141, 143

(56) References Cited

U.S. PATENT DOCUMENTS

| | | | | |
|---|---|---|---|---|
| 5,905,556 A | * | 5/1999 | Suzuki et al. ................ | 349/141 |
| 5,914,762 A | * | 6/1999 | Lee et al. .................... | 349/141 |
| 5,946,066 A | * | 8/1999 | Lee et al. .................... | 349/141 |
| 5,953,092 A | * | 9/1999 | Sung et al. .................. | 349/143 |
| 5,995,186 A | * | 11/1999 | Hiroshi ........................ | 349/141 |
| 6,052,168 A | * | 4/2000 | Nisjida et al. ............... | 349/141 |
| 6,078,375 A | * | 6/2000 | Matsumoto et al. ......... | 349/123 |
| 6,128,061 A | * | 10/2000 | Lee et al. .................... | 349/141 |

FOREIGN PATENT DOCUMENTS

| | | |
|---|---|---|
| JP | 01-120528 | 5/1989 |
| JP | 06-148596 | 5/1994 |
| JP | 07-301814 | 11/1995 |

(List continued on next page.)

OTHER PUBLICATIONS

SID 99 Digest, p. 202–205 (ISSN0099–0966X/99/3001–0202: "Late–News Paper: A Novel Wide–Viewing–Angle Technology: Ultra–Trans View", S. H. Lee, S. L. Lee, H. Y. Kim, T. Y. Eom, Hyundai Electronics Industries, Kyungki–Do, Korea.

"Field Effects in Nematic Liquid Crystals Obtained with Interdigtial Electrodes", R. A. Soref, *Journal of Applied Physics*, vol. 45, No. 12, Dec. 1974.

"High–Transmittance, Wide–Viewing–Angle Nematic Liquid Crystal Display Controlled by Fringe–Field Switching", S. H. Lee, et al., Asia Display '98 International Display Research Conference, pp. 371–374, Sep. 28, 1998 to Oct. 1, 1998.

*Primary Examiner*—William L. Sikes
*Assistant Examiner*—Dung Nguyen
(74) *Attorney, Agent, or Firm*—Michael Best & Friedrich LLC; J. Warren Whitesel

(57) ABSTRACT

A liquid crystal display and a method of operating such liquid crystal display in which display operation is performed by changing a director of said liquid crystal molecules mainly in a plane parallel to first and second substrate forming a liquid crystal display panel. Liquid crystal molecules in the liquid crystal display panel have a negative anisotropy of permittivity. The liquid crystal display comprises: a first common electrode disposed on the side of said first substrate; an insulating layer formed on the first common electrode; at least one pixel electrodes each of which is formed on the insulating layer and has a plurality of opening portions; a second common electrode disposed on the side of the second substrate. The first common electrode comprises at least a particular portion formed in a particular area which extends from a non-opening portion to an opening portion of the pixel electrode and in which the first common electrode overlaps the non-opening portion in a cross section perpendicular to the substrates.

25 Claims, 18 Drawing Sheets

FOREIGN PATENT DOCUMENTS

| | | |
|---|---|---|
| JP | 08-062586 | 3/1996 |
| JP | 09-061842 | 3/1997 |
| JP | 09-061855 | 3/1997 |
| JP | 09-325340 | 12/1997 |
| JP | 09-325346 | 12/1997 |
| JP | 2743293 | 2/1998 |
| JP | 10-062802 | 3/1998 |
| JP | 63-021907 | 5/1998 |
| JP | 10-319434 | 12/1998 |
| JP | 11-064892 | 3/1999 |
| JP | 11-125836 | 5/1999 |

* cited by examiner

LIQUID CRYSTAL DISPLAY AND METHOD OF PERFORMING DISPLAY OPERATION

FIELD OF THE INVENTION

The present invention relates generally to a liquid crystal display, and more particularly to a liquid crystal display in which display operation is performed by driving liquid crystal molecules in a plane parallel to a substrate of the liquid crystal display.

BACKGROUND OF THE INVENTION

Such type of liquid crystal display is disclosed, for example, in "Field effects in nematic liquid crystals obtained with interdigital electrodes", by R. A. Soref, Journal of Applied Physics, vol. 45, No. 12, December 1974, which liquid crystal display is hereafter referred to as Prior Art Example 1. In the Prior Art Example 1, there are described basic principles of driving liquid crystal molecules, such as what electric field should be applied to the liquid crystal molecules to rotate the liquid crystal molecules within a plane parallel to a substrate and the like.

Also, taking the basic principles described in the Prior Art Example 1 into consideration, Japanese examined patent publication No. 63-21907 discloses a liquid crystal display in which there is provided a switching element for each pixel, which liquid crystal display is hereafter referred to as Prior Art Example 2.

However, in these two Prior Art Examples, only basic principles, operation and the like are described, and there are still various problems in practicability. Therefore, taking these basic principles into consideration, various research have been done aiming at an electrode structure, alignment direction of liquid crystal molecules, contrast characteristic, and the like.

For example, there is known a liquid crystal display disclosed in Japanese patent laid-open publication No. 1-1200528 which aims at improving a switching characteristic and enabling a high speed operation, which liquid crystal display is hereafter referred to as Prior Art Example 3. In this liquid crystal display, a pair of electrodes are provided in each of an upper substrate and a lower substrate. These electrodes are switched to produce two kind of electric fields and, thereby, alignment direction of liquid crystal molecules is switched at high speed. However, in the structure of the Prior Art Example 3, it is necessary to individually control respective electrode pairs disposed on the upper substrate and the lower substrate, and there are many other problems.

On the other hand, there is known a liquid crystal display disclosed in Japanese patent publication No. 2743293, which liquid crystal display is hereafter referred to as Prior Art Example 4. In this patent publication, there is described a result of research on an initial alignment direction, and relationship between a twist angle and a distribution of contrast characteristic, taking alignment direction of liquid crystal molecules into consideration. However, in the liquid crystal display of the Prior Art Example 4, a conventionally proposed interdigital electrode structure is used and no improvement is made on the electrode structure. In other words, in the Prior Art Example 4, statistics were obtained on electric field caused by the conventional interdigital electrode structure and relationship between the initial alignment direction of liquid crystal molecules and contrast characteristic, and confirmation was made on the effect obtained by such structure. Therefore, the Prior Art Example 4 is valuable as a research result, but does not propose a new technology for liquid crystal display. In the Japanese patent publication No. 2743293, although it is described that an active matrix type liquid crystal display is realizable by using this structure, no proposition is made on a structure of an electrode therefore.

Thereafter, in Japanese patent laid-open publication No. 6-148596, there is proposed an active matrix type liquid crystal display with a concrete electrode structure, which liquid crystal display is hereafter referred to as Prior Art Example 5. In the liquid crystal display of the Prior Art Example 5, thin film transistors (TFT's) are use as active elements, and a structure of electrodes including the active elements is described in this publication. More particularly, in the Prior Art Example 5, basically, two electrodes disposed parallel with each other are used in each pixel. Between the two electrodes, an electric field is produced and, thereby, liquid crystal molecules are rotated in a plane parallel with a substrate. However, in the Japanese patent laid-open publication No. 6-148569, a description is included which refers to the merit of not using transparent electrodes and, therefore, consideration is not given on aperture ratio and the like.

In the Prior Art Example 1 through Prior Art Example 5 mentioned above, liquid crystal molecules are driven such that the liquid crystal molecules rotate in a plane parallel with a substrate to perform display operation. Therefore, when compared with TN mode and the like in which liquid crystal molecules are driven between horizontal condition and vertical condition to perform display operation, it is expected that better viewing angle characteristics can be obtained by the liquid crystal displays of the Prior Art Examples 1 through 5. Hereafter, an operating mode in which liquid crystal molecules are rotated in a plane parallel to the substrate to perform display operation is called In-Plain Switching (IPS).

However, the Prior Art Example 1 through Prior Art Example 5 have various problems to be solved such as low aperture ratios and the like caused by the interdigital electrode structure, and it is difficult obtain such superior performance in practical use as to completely replace liquid crystal displays having TN mode with such IPS type liquid crystal displays.

After a proposition of the Prior Art Example 5, various IPS mode liquid crystal displays are proposed in which merits of the TN mode and the like are retained and demerits of the IPS mode are improved and which have high display characteristics not only in theory but also in practical use.

For example, considering an electrode structure and an electrode material and aiming at improving brightness of a displayed image, Japanese patent laid-open publication No. 9-61842 discloses a liquid crystal display, which is hereafter referred to as Prior Art Example 6. As mentioned above, a conventional electrode structure for IPS mode generally had a pair of interleaved sets of parallel strip-shaped fingers to constitute an interdigital structure. As a result thereof, when a liquid crystal display panel is viewed from the front of the panel, the proportion of the area where the electrodes are not disposed to the total pixel area becomes inevitably small. Also, chromium (Cr) generally used as a material of the electrodes shades light, and therefore it was impossible to obtain high aperture ratio. On the other hand, in the Prior Art Example 6, a transparent material, for example, ITO and the like, which is used as a material of a common electrode of a conventional liquid crystal display of TN mode and the like is used as a material for electrodes. Thereby, unnecessarily shaded area in each pixel area can be decreased and the aperture ratio of each pixel is substantially increased. However, in the Prior Art Example 6, the structure of the electrodes themselves is not changed, and new technology is not proposed except that the transparent material is used as a material of the electrodes.

To improve both a response speed and a transmittance of liquid crystal display, there are proposed liquid crystal displays in Japanese patent laid-open publication No. 11-64892, which is hereafter referred to as Prior Art Example 7, and in "High-Transmittance, Wide-Viewing-Angle Nematic Liquid Crystal Display Controlled by Fringe-Field Switching", by S. H. Lee, et al., ASIA DISPLAY '98 INTERNATIONAL DISPLAY RESEARCH CONFERENCE, pp. 371–374, Sep. 28-Oct. 1, 1998, which is hereafter referred to as Prior Art Example 8. Each of these Prior Art Example 7 and Prior Art Example 8 discloses a technology somewhat similar to that of the Prior Art Example 6, and proposes ratios of various sizes to obtain good display characteristics to improve the liquid crystal display of the above-mentioned Prior Art Example 6, taking relationship between the ratios of various sizes such as electrode widths, the distance between electrodes and the like and display characteristics into consideration. Both in the Prior Art Example 7 and the Prior Art Example 8, both pixel electrodes and common electrodes are made of transparent materials to improve aperture ratio, similarly to the Prior Art Example 6.

On the other hand, in order to improve display irregularity and unsymmetry of viewing angle characteeristics, Japanese patent laid-open publication No. 10-319434 discloses a liquid crystal display which uses an electrode structure different from that of the conventional liquid crystal displays, which is hereafter referred to as Prior Art Example 9.

In the Prior Art Example 9, two problems to be solved are described. One of them is caused because no conductive film exists on a substrate, that is, an opposing substrate, on which electrodes are not disposed, in a conventional liquid crystal display panel having IPS mode. For example, when an electrified person touches the opposing substrate, electric charges move from the person to the substrate, and the opposing substrate is locally electrified. In such case, since no conductive film is formed on the opposing substrate, unintended electric field parallel to the substrate arises due to the electric charges existing locally. If liquid crystal molecules are rotated by the unintended electric field, there is a possibility, for example, that light passes through the liquid crystal display panel although the panel should display black. Therefore, display irregularity arises. Another problem of the Prior Art Example 9 concerns control of a tilt angle. For example, when anti-parallel rubbing is performed, a pretilt angle arises in liquid crystal molecules near a alignment film or layer due to the rubbing process and the like, so that whole liquid crystal layer has a tilt angle. Therefore, direction of viewing the liquid crystal molecules differs depending on the angle at which a person looks onto the panel, and viewing angle characteristics become unsymmetrical with respect to the front surface of the panel.

In order to solve these two problems, in the Prior Art Example 9, there is provided an electrode on the opposing substrate, in addition to the conventional structure required for the IPS mode. In operation of the liquid crystal display of the Prior Art Example 9, liquid crystal molecules are rotated in a plane parallel to the substrate in a manner similar to the conventional liquid crystal display of the IPS mode. Also, a component of an electric field which is perpendicular to the substrate is increased by the newly added electrode, and the liquid crystal molecules are also controlled in a direction perpendicular to the substrate, thereby decreasing a tilt angle. To realize such operation, liquid crystal molecules are used which have a negative anisotropy of permittivity. By using such structure, it is possible to obtain viewing angle characteristics which are symmetrical with respect to the front surface of the panel. Also, when such newly added electrode is provided on whole surface of the opposing substrate, even if the surface of the opposing substrate is locally electrified, the influence of such electrification can be obviated by the newly added electrode. Therefore, the problem of display irregularity caused by the unintended electric field can be obviated.

As a reference technology, description will be made on a liquid crystal display disclosed in Japanese patent laid-open publication No. 9-325346, which is hereafter referred to as Prior Art Example 10.

As mentioned above, it is conventionally known that a liquid crystal display of the TN mode and the like has relatively narrow viewing angle characteristics, but, by using a technology of rotating liquid crystal molecules in a plane horizontal with respect to the substrate, such as the IPS mode technology, wide viewing angle characteristics can be obtained. Therefore, in the Prior Art Example 10, user can switch between these two viewing angle characteristics in accordance with the purpose of using the liquid crystal display, and four kinds of electrodes are provided every pixel. Among these electrodes, the first through the third electrodes are provided on one of a pair of opposing substrates, and the fourth electrode is provided on the other substrate. More particularly, the first electrode disposed on one of the substrates and the fourth electrode disposed on the other substrate constitute a pixel electrode and an opposing electrode, and the second and third electrodes constitute the pixel electrode and the common electrode used in the above-mentioned Prior Art Example 1 through Prior Art Example 9. Also, in order to independently control an electrode pair of the first and fourth electrodes and an electrode pair of the second and third electrodes, the first through the third electrodes are independently disposed in each pixel, and two switching elements are provided every pixel.

As can be understood from the above-mentioned brief explanation, the Prior Art Example 10 is for a special use, and has the structure slightly differ from that of each of the abovementioned Prior Art Example 1 through Prior Art Example 9. Also, in the Prior Art Example 10, since the first through the third electrodes are independently disposed in each pixel and two switching elements are provided every pixel, the liquid crystal display of the Prior Art Example 10 is not practical in a manufacturing cost and the like.

The Prior Art Example 10 was explained above only for reference when reviewing documents concerning liquid crystal displays.

When compared only the cross sectional structures of the liquid crystal display panels shown in the Prior Art Example 9 and the Prior Art Example 10, it may be seen as if they concern the same technology. However, they disclose quite different technologies, and operate differently. Those of ordinary skill in the art clearly understand the difference between these Prior Art Examples from the specifications thereof.

In other words, in order to gasp respective technologies of the liquid crystal displays, it is not appropriate to consider only the cross sectional structure in a pixel area shown in the drawing. It is necessary to consider all portions of the description describing characteristic features of the liquid crystal display. Considering these points, problems of the Prior Art Example 1 through Prior Art Example 9 are summarized as the problems to be solved by the present invention.

As mentioned above, each of all the Prior Art Example 1 through Prior Art Example 9 utilizes a potential difference between two kinds of electrodes disposed parallel to each other to form an electric field parallel to the substrate.

However, the electric field generated in this way becomes parallel to the substrate in the vicinity of the electrodes, but often becomes round and arc shaped as it becomes near the opposing substrate.

In such case, in the Prior Art Example 1 through Prior Art Example 8, the arc shaped electric field give influence on other layer or layers formed on the opposing substrate, and on the inside of the substrate. For example, as another layer formed on the opposing substrate, there is a layer comprising organic material and the like such as a color layer for performing color display. However, the layer comprising such material has the property that it is easily electrified and has a residual potential. Therefore, when the layer such as the color layer is influenced by the arc shaped electric field, an unintended potential difference appears in the color layer and such potential difference remains therein for a relatively long time. As a result, when a different image signal is written into a pixel electrode in a subsequent cycle time, it is impossible to produce a desired electric field because of the electric field caused by the residual electric charges, so that precise display is not realized.

On the other hand, in the Prior Art Example 9, there is a possibility that arc shaped electric field is produced in the vicinity of the opposing substrate. However, in the Prior Art Example 9, since the electrode is formed on the surface of the opposing substrate on the side of a liquid crystal material layer, the arc shaped electric field does not give influence on the color layer disposed on the opposing substrate or on the inside portion of the opposing substrate. Therefore, the abovementioned problem of the Prior Art Examples 1 through 8 does not occur in the Prior Art Example 9.

However, although the electrode disposed on the opposing substrate in the Prior Art Example 9 can solve the problem of the Prior Art Example 1 through Prior Art Example 8, the electrode does not function to directly avoid an influence of the electric field from the liquid crystal layer to the opposing substrate. As mentioned above, the electrode disposed on the opposing substrate in the Prior Art Example 9 mitigates the influence toward the side of the liquid crystal layer caused when the opposing substrate is locally electrified by external cause, and the electrode is formed mainly for controlling a tilt angle of liquid crystal molecules in the liquid crystal layer on the side of the opposing substrate. Here, if only the former problem is to be solved, it is not always necessary to provide the electrode on the opposing substrate on the side of the liquid crystal layer. It is also possible that the electrode is disposed on the most outer side, that is, on the side of a viewer or a user of the liquid crystal display. Therefore, the reason why the electrode formed on the opposing substrate must exist on the side of the liquid crystal layer is to perform the latter object, that is, to control the tilt angle of the liquid crystal molecules.

When the control of the tilt angle in the Prior Art Example 9 is considered, control of a potential voltage supplied to the electrode disposed on the opposing substrate becomes complicated. Generally, as an image signal, an alternative current (AC) signal is applied to each pixel electrode. Also, in order to precisely control a tilt angle, it is necessary to consider not only a direction of an electric field to be produced but also a required intensity of the electric field. Further, it is well known that an intensity of an electric field is determined by relationship of a potential difference and a distance. Considering these items and in order to precisely control the tilt angle in the Prior Art Example 9, it is necessary to vary a potential voltage applied to the electrode disposed on the opposing substrate in accordance with an image signal.

SUMMARY OF THE INVENTION

Considering the above-mentioned technologies disclosed in the Prior Art Example 1 through Prior Art Example 9, it is an object of the present invention to provide a novel liquid crystal display which does not require complicated control of a voltage signal and the like described in the Prior Art Example 9 and which does not have the disadvantages of the Prior Art Example 1 through Prior Art Example 8.

It is another object of the present invention to provide a liquid crystal display which has superior display characteristics.

It is still another object of the present invention to provide a liquid crystal display in which alignment direction or directions of liquid crystal molecules can be efficiently and easily controlled.

It is another object of the present invention to provide a liquid crystal display in which it is possible to prevent an electric field for driving liquid crystal molecules from affecting an inside portion of an opposing substrate and various layers such as a color filter layer and the like.

It is still another object of the present invention to provide a liquid crystal display which can be easily manufactured.

In order to solve the above-mentioned problems, the inventors of the present invention carefully considered on the Prior Art Example 1 through Prior Art Example 9, and obtained the following conclusion.

In order to solve the problems of the technology of the Prior Art Example 1 through Prior Art Example 8, it is necessary to provide a conductor layer (electrode) on an opposing substrate. By disposing such conductive layer (electrode), an electric field which includes large component perpendicular to a substrate is produced between a pixel electrode and the conductive layer (electrode) or between a common electrode and the conductive layer (electrode).

However, in each of the Prior Art Example 1 through Prior Art Example 9, the pixel electrode and the common electrode are disposed such that an electric field parallel with the substrate is produced. Therefore, by such structure, a superposed electric field, that is, an electric field which actually gives an influence on liquid crystal molecules, is not an electric field parallel with the substrate. Also, in such condition, in order to rotate the liquid crystal molecules in a plane parallel with the substrate, complicated control is required on the electrode disposed on the side of the opposing substrate, as can be seen from the Prior Art Example 9.

Therefore, in the present invention, liquid crystal molecules having a negative anisotropy of permittivity are used, and an electric field including large component which is perpendicular to the substrate is produced between the pixel electrode and the common electrode. By using a synthesized electric field which is obtained by superposing such electric field and an electric field produced between the pixel electrode and the electrode disposed on the opposing substrate, the liquid crystal molecules are controlled such that the liquid crystal molecules are driven in a plane parallel with the substrate.

That is, an electric field produced between the pixel electrode and the common electrode is assumed to be a first electric field, and an electric field produced between the pixel electrode and the electrode disposed on the opposing substrate is assumed to be a second electric field. In such case, liquid crystal molecules near the substrate on which the pixel electrode is disposed and liquid crystal molecules near the opposing substrate are easily influenced by the first electric field and the second electric field, respectively, but, because of the property of the liquid crystal molecules, operation in the direction perpendicular to the substrate are restrained by each other. More particularly, liquid crystal molecules near the substrate on which the pixel electrode and the like are disposed are easily influenced by the first electric field, tend to rotate in a plane parallel to the substrate, and form a first predetermined tilt angle in a direction perpendicular to the substrate. On the other hand, liquid crystal molecules near the opposing substrate are easily influenced by the second electric field, tend to rotate in a plane parallel to the substrate in manner similar to the liquid crystal molecules mentioned above, and form a second predetermined tilt angle in a direction perpendicular to the substrate. Here, when the surface of the substrate is considered as a reference plane, the second predetermined tilt angle and the first predetermined tilt angle differ from each other in polarity of angles. However, since liquid crystal molecules has viscoelasticity as its property, operation for forming the first predetermined tilt angle and operation for forming the second predetermined tilt angle are mutually influenced and restrained. In this way, change of alignment toward a direction perpendicular to the substrate is strongly suppressed, and liquid crystal molecules can smoothly rotate in a plane parallel to the substrate. Thereby, superior alignment can be maintained in optical characteristics.

Considering the above-mentioned influence of the electric field on liquid crystal molecules, in the present invention, the electrode disposed on the opposing substrate also functions as a kind of a common electrode. In the present invention, these two kinds of common electrodes are mutually distinguished by the substrates on which such common electrodes are disposed. That is, one of the common electrode disposed on the substrate on which the pixel electrodes are disposed is called a first common electrode, and the other common electrode disposed on the opposing substrate is called a second common electrode.

In practice, the present invention provides a liquid crystal display which uses a novel method of driving liquid crystal molecules mentioned below, as a means for solving the problems mentioned above.

According to an aspect of the present invention, there is provided a liquid crystal display having a first substrate, a second substrate parallel opposed to the first substrate, and a liquid crystal layer including liquid crystal molecules, wherein display operation is performed by changing a director of the liquid crystal molecules mainly in a plane parallel to the first and second substrate, the liquid crystal display comprising: a first common electrode which is disposed on the side of the first substrate and which receives a first predetermined potential; an insulating layer formed on the first common electrode; at least one pixel electrodes each of which is formed on the insulating layer and has a plurality of opening portions; a second common electrode which is disposed on the side of the second substrate and which receives a second predetermined potential; wherein the liquid crystal molecules have a negative anisotropy of permittivity; and wherein the first common electrode comprises at least a particular portion formed in a particular area which extends from a non-opening portion to an opening portion of the pixel electrode and in which the first common electrode overlaps the non-opening portion in a cross section perpendicular to the substrates.

In this first liquid crystal display, a first predetermined potential is applied to the first common electrode, and a second predetermined potential is applied to the second common electrode. More particularly, the first predetermined potential produces a first electric field comprising a first horizontal electric field component which is horizontal (parallel) with the substrate and a first vertical component which is vertical with the substrate, between the first common electrode and the pixel electrode, when a voltage is applied to the pixel electrode to drive the pixel. Also, the second predetermined potential produces a second electric field comprising a second horizontal electric field component which is horizontal (parallel) with the substrate and a second vertical component which is vertical with the substrate, between the second common electrode and the pixel electrode, when a voltage is applied to the pixel electrode to drive the pixel. When the first and second predetermined potentials are applied to the first and second common electrode and thereby the first and second electric field are produced, these electric fields are superposed on each other and, as a result thereof, give influence on liquid crystal molecules in the liquid crystal layer in a manner mentioned above.

In this case, it is preferable that the first common electrode is formed on the first substrate, and wherein the particular portion of the first common electrode has, in a cross section perpendicular to the substrates, a shape which covers whole area corresponding to the plurality of opening portions on the first substrate.

It is also preferable that the first common electrode comprises, in a cross section perpendicular to the substrates, common electrode side opening portions in an area which overlaps with the non-opening portion of the first substrate.

It is further preferable that the first common electrode is formed on the first substrate, and has a shape which covers the first substrate every pixel.

It is advantageous that the second common electrode is formed on whole area of the second substrate.

It is also advantageous that a portion of the first common electrode corresponding to one pixel is directly coupled with a portion of the first common electrode corresponding to anther pixel which is adjacent to the one pixel in a predetermined direction.

It is further advantageous that the liquid crystal display further comprises an auxiliary conductive portion which is formed of a conductive material having lower resistivity than that of a conductive material forming the first common electrode and which is coupled with the first common electrode.

It is preferable that the liquid crystal display further comprises: a plurality of auxiliary conductive portions each of which is formed of a conductive material having lower resistivity than that of a conductive material forming the first common electrode; wherein the first common electrode is constituted of first common electrode portions each of which is provided for a pixel; and wherein each of the auxiliary conductive portions couples the first common electrode portions which are adjacent with each other in a predetermined direction.

It is also preferable that the liquid crystal display is an active matrix type liquid crystal display which comprises a switching element for each pixel.

It is further preferable that the switching element is a thin film transistor.

It is advantageous that the auxiliary conductive portion is formed in the same layer as that of the gate electrode of the thin film transistor.

It is also advantageous that the auxiliary conductive portion is formed by patterning an electrode material of the gate electrode, in the same process step as that of the gate electrode.

It is further advantageous that the first predetermined potential and the second predetermined potential are mutually equal potential.

It is preferable that the first substrate, the second substrate and the liquid crystal layer compose a liquid crystal display panel; and wherein the first common electrode and the second common electrode are coupled with each other at a peripheral portion of the liquid crystal display panel.

It is also preferable that the liquid crystal display further comprises a potential adjusting means which adjust the first predetermined potential and the second predetermined potential applied to the first and second common electrodes.

It is further preferable that the second common electrode is formed of a transparent electrode material; and wherein at least one of the pixel electrodes and the first common electrode is also formed of a transparent electrode material.

It is advantageous that each of the plurality of opening portions of the pixel electrode has a parallelogram shape; and wherein an angle between a direction along short sides of the parallelogram and a direction along long sides of the parallelogram is smaller than an angle between the alignment direction of the liquid crystal molecules and the direction along long sides of the parallelogram.

It is also advantageous that each of the plurality of opening portions of the pixel electrode has a parallelogram shape; and wherein the alignment direction of the liquid crystal molecules is determined to be a direction perpendicular to a direction of long sides of the parallelogram.

It is further advantageous that the plurality of opening portions are grouped into two groups; and wherein, in the plurality of opening portions of the two groups, long sides of parallelogram shapes of the opening portions of both groups extend in the same direction, and short sides thereof are disposed symmetrically with respect to a line having a direction perpendicular to the direction of the long sides.

It is preferable that each of the plurality of opening portions of the pixel electrode has a V-shape having short sides located along the alignment direction of the liquid crystal molecules and composed by combining two parallelograms which share a short side with each other and whose long sides are disposed symmetrically with respect to the alignment direction.

It is also preferable that the liquid crystal display further comprises: a color layer for realizing color display on the side of the second substrate; and wherein the color layer is formed as a layer which is farther from the liquid crystal layer than the second common electrode.

According to another aspect of the present invention, there is provided a liquid crystal display having a first substrate, a second substrate opposed to the first substrate, and a liquid crystal layer including liquid crystal molecules, wherein display operation is performed by changing a director of the liquid crystal molecules mainly in a plane parallel to the first or second substrate, the liquid crystal display comprising: a first common electrode which is disposed on the side of the first substrate and which receives a first predetermined potential; an insulating film formed on the first common electrode; at least one pixel electrodes each of which is formed on the insulating film and has a plurality of opening portions; a second common electrode which is disposed on the side of the second substrate and which receives a second predetermined potential; wherein the liquid crystal molecules have negative anisotropy of permittivity; and wherein when a drive potential is applied to the pixel electrode to drive a pixel having the pixel electrode, the first common electrode together with the pixel electrode produce a first electric field including a first component which is perpendicular to the substrates, and the second common electrode together with the pixel electrode produce a second electric field including a second component which is perpendicular to the substrates and which has a direction opposite to that of the first component, the first and second electric fields are superposed to produce an electric field which drive the liquid crystal molecules in a plane parallel to the substrates.

According to still another aspect of the present invention, there is provided, in a liquid crystal display having a first substrate, a second substrate opposed to the first substrate, and a liquid crystal layer including liquid crystal molecules, wherein display operation is performed by changing a director of the liquid crystal molecules mainly in a plane parallel to the first or second substrate, a method of performing display operation comprising: forming a first common electrode on the side of the first substrate; forming an insulating film on the first common electrode; forming at least one pixel electrodes on the insulating film, each of the at least one pixel having a plurality of opening portions; forming a second common electrode on the side of the second substrate; forming an liquid crystal display panel of the liquid crystal display by using liquid crystal molecules have a negative anisotropy of permittivity; applying a first predetermined potential to the first common electrode such that when a drive potential is applied to the pixel electrode to drive a pixel having the pixel electrode, the first common electrode together with the pixel electrode produce a first electric field including a first component which is perpendicular to the substrates; applying a second predetermined potential to the second common electrode such that when a drive potential is applied to the pixel electrode to drive a pixel having the pixel electrode, the second common electrode together with the pixel electrode produce a second electric field including a second component which is perpendicular to the substrates and which has a direction opposite to that of the first component; and superposing aid first and second electric fields in the liquid crystal layer, wherein, by using viscoelasticity of liquid crystal molecules, a component of operation in a direction perpendicular to the substrates in an operation in which liquid crystal molecules near the first substrate liable to be influenced by the first electric field are going to rotate in a plane horizontal with the substrate and are going to form a first predetermined tilt angle in a direction perpendicular to the substrates, and a component of operation in a direction perpendicular to the substrates in an operation in which liquid crystal molecules near the second substrate liable to be influenced by the second electric field are going to rotate in a plane horizontal with the substrate and are going to form a second predetermined tilt angle in a direction perpendicular to the substrates, the second predetermined tilt angle being opposite in direction to the first predetermined tilt angle, are influenced and restrained by each other, thereby rotating the liquid crystal molecules a plane parallel to the substrates.

In this case, it is preferable that the first predetermined potential and the second predetermined potential are equal to each other.

It is also preferable that a portion of the first common electrode corresponding to one pixel is directly coupled with a portion of the first common electrode corresponding to anther pixel which is adjacent to the one pixel in a predetermined direction.

It is further preferable that the method further comprises forming a plurality of auxiliary conductive portions each of which is formed of a conductive material having lower resistivity than that of a conductive material forming the first common electrode; wherein the first common electrode is constituted of first common electrode portions each of which is provided for a pixel; and wherein each of the auxiliary conductive portions couples the first common electrode portions which are adjacent with each other in a predetermined direction.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, liquid crystal displays according to embodiments of the present invention will now be explained in detail.

[Embodiment 1]

Figure 1:
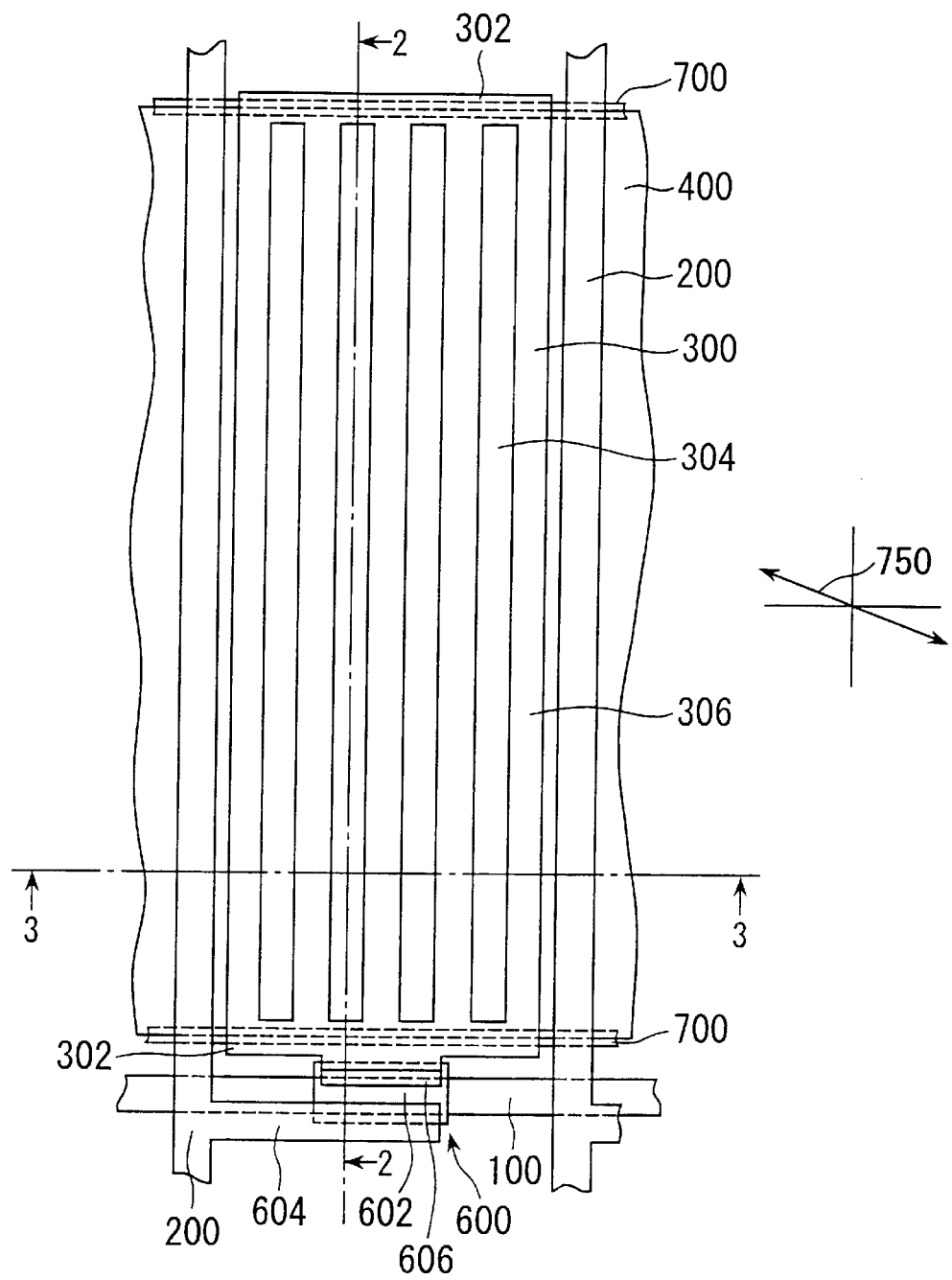
FIG. 1 is a partial front view showing a structure of a liquid crystal display panel of a liquid crystal display according to a first embodiment of the present invention.
Figure 2:
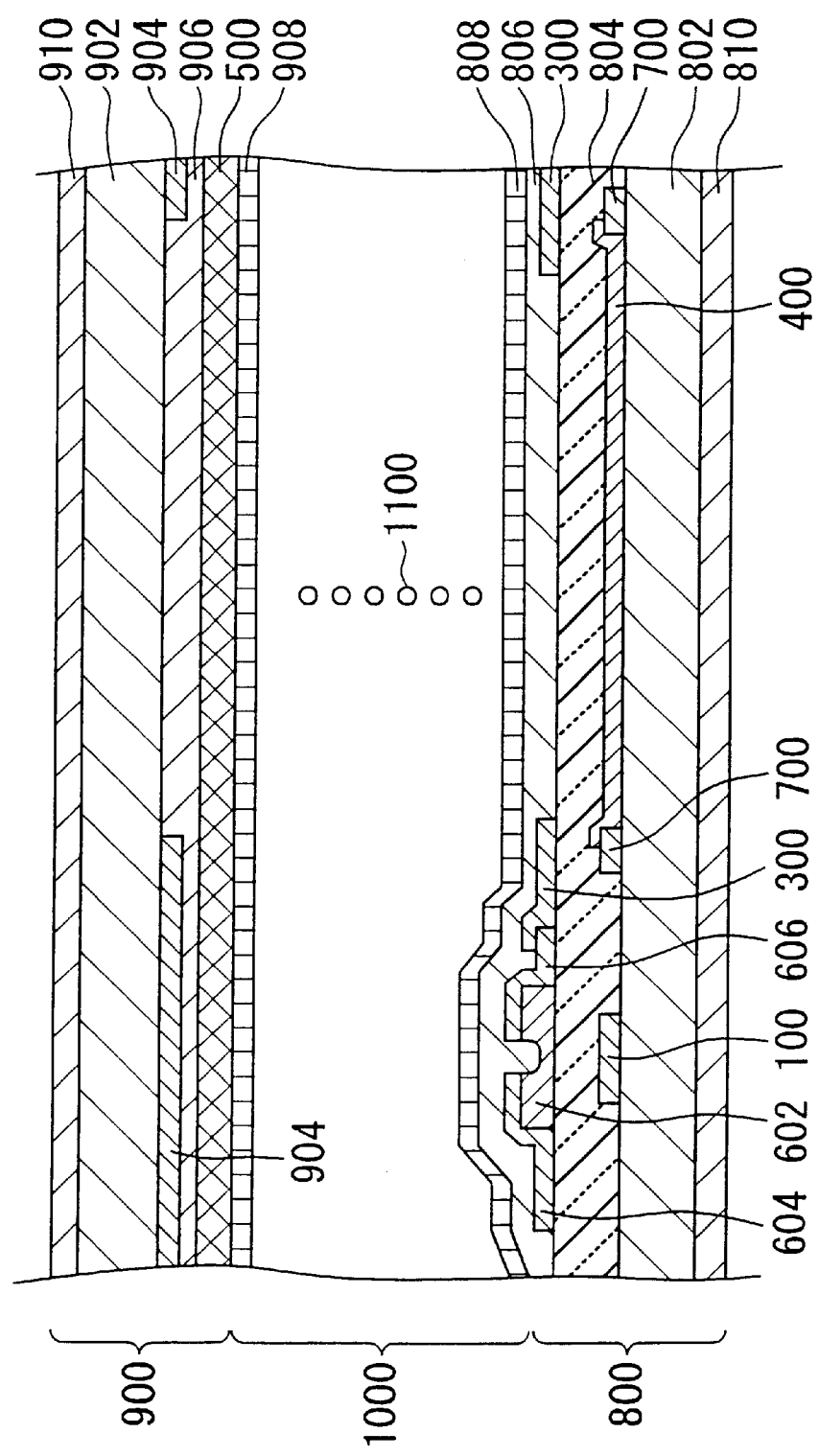
FIG. 2 is a partial cross sectional view taken on line 2—2 of FIG. 1.
Figure 3:
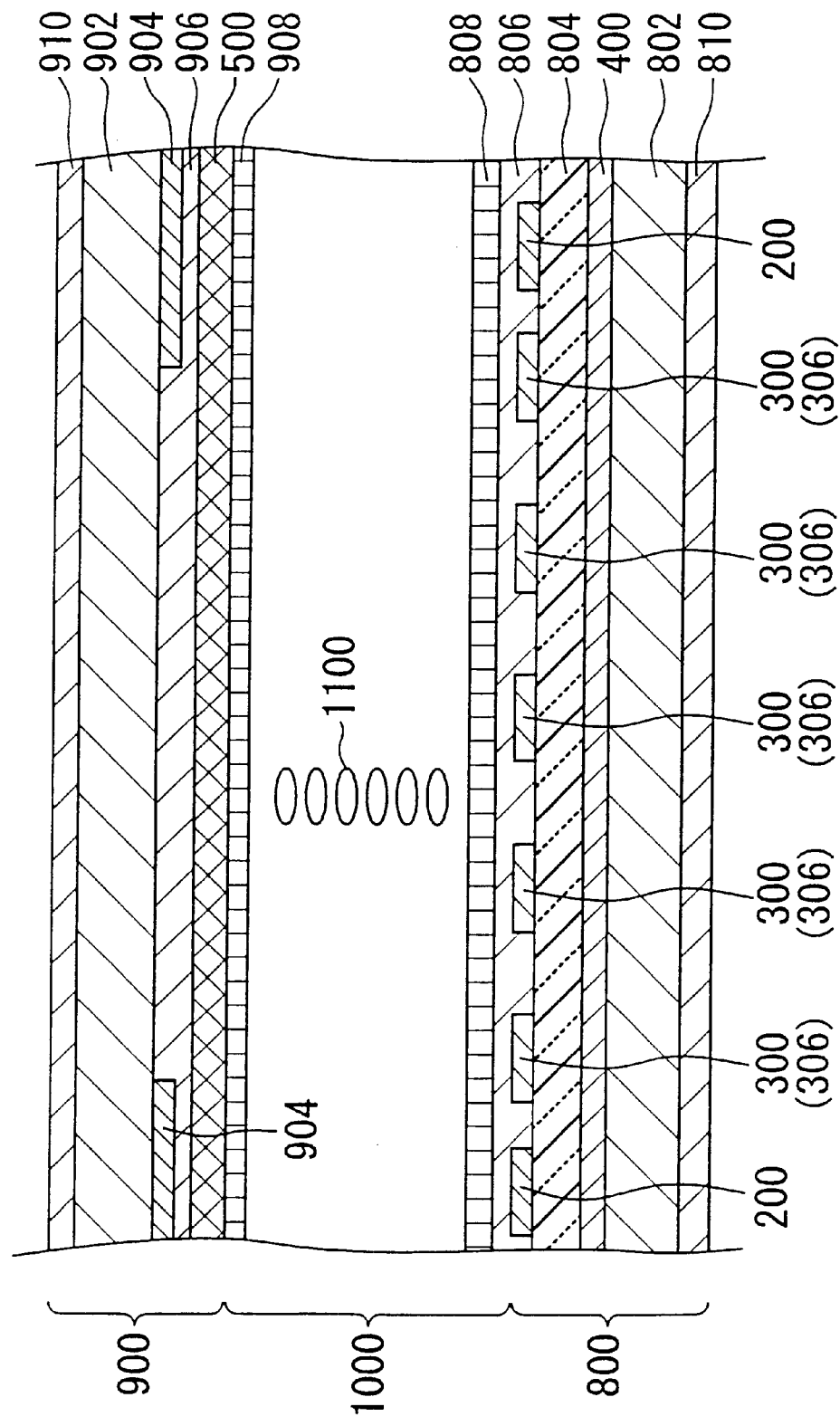
FIG. 3 is a partial cross sectional view taken on line 3—3 of FIG. 1.

FIG. 1 through FIG. 3 illustrate a structure of a liquid crystal display according to the first embodiment. FIG. 1 shows an area of approximately one pixel when viewed from the front side of the liquid crystal display panel. FIG. 2 and FIG. 3 are cross sectional views taken along lines 2—2 and 3—3 in FIG. 1, respectively.

As shown in FIG. 1, a gate wiring or gate wiring conductor 100 extends to right and left in the liquid crystal display panel in the drawing, and a drain wiring or drain wiring conductor 200 extends in a direction perpendicular to the gate wiring 100, that is, in a direction of up and down of the liquid crystal display panel. Although not shown in the drawing, a plurality of such gate wirings 100 are disposed parallel to each other. Also, a plurality of drain wirings 200 are disposed parallel to each other. In this embodiment, each pixel area is defined approximately as an area surrounded by these gate wirings 100 and drain wirings 200.

In each of the pixel areas, as shown in FIG. 1, there is provided a pixel electrode 300. In this embodiment, the pixel electrode 300 is formed by transparent conductive material such as ITO, but the pixel electrode 300 can be made of opaque conductive material, such as Cr and the like. The pixel electrode 300 comprises the trunk portions 302 which are parallel with the gate wiring 100, and a plurality of branch portions 306 which extend parallel with the drain wirings 200 and couple between the trunk portions 302. Also, between the branch portions 306, there are formed opening portions 304. Similarly to the branch portions 306, the shape of each of the opening portions 304 is a rectangle having a long side in a direction parallel with the drain wiring 200. Here, the branch portions 306 are called non-opening portions, when compared with the opening portions 304.

The pixel electrode 300 is coupled with a thin film transistor (TFT) 600 as a switching element, and the above-mentioned drain wiring 200 is also coupled with the TFT 600. Thereby, when the TFT 600 is turned on, an image signal supplied to the drain wiring 200 is written into the pixel electrode 300.

Now, referring also to FIG. 2 and FIG. 3, an explanation will be made on a cross sectional structure.

The liquid crystal display panel portion of the liquid crystal display according to this embodiment generally has a structure comprising a TFT substrate 800, a color filter (CF) substrate 900, and a liquid crystal layer 1000 which comprises liquid crystal molecules 1100 and which is sandwiched or inserted between the TFT substrate 800 and CF substrate 900.

The TFT substrate 800 comprises, as a main material, a first substrate 802 which is made of a transparent insulating material such as glass and the like. On one surface of the first substrate 802, there are disposed the gate wiring 100 and the first common electrode 400. The first common electrode 400 comprises band shaped portions each corresponding to a row, and each of the band shaped portions is shared by pixels which are adjacent in the direction to right and left of the liquid crystal display panel. The band shaped portions are mutually coupled at a peripheral portion of the panel. Also, as apparent from FIG. 2 and FIG. 3, the above-mentioned pixel electrode 300 is disposed, in each pixel area, over the first common electrode 400, that is, on the side of the liquid crystal layer 1000. In this embodiment, the first common electrode 400 is made of a transparent conductive material, such as ITO and the like.

Especially, in this embodiment, an auxiliary conductive portion 700 is disposed along the first common electrode 400 and extends right and left of the liquid crystal display panel. The auxiliary conductive portion 700 is made of a material having lower resistivity than that of the conductor constituting the first common electrode 400. By disposing such auxiliary conductive portion 700, it is possible to stabilize a potential of the first common electrode 400. In this embodiment, the auxiliary conductive portion 700 is, as mentioned later, formed in the same process as that of the gate wiring 100 and by using the same conductive material as that of the gate wiring 100.

Further, there is formed an insulating film 804 which covers the whole portion of the gate wiring 100, the first common electrode 400 and the auxiliary conductive portion 700. Also, on the insulating film 804 and in an area corresponding to the gate wiring 100, there is formed a semiconductor layer 602 made, for example, of amorphous silicon and the like. Further, there are formed a drain electrode 604 and a source electrode 606 which are coupled with each other via the semiconductor layer 602. The semiconductor layer 602 functions as a channel region of the TFT 600. Therefore, the insulating film 804 over the gate wiring 100 functions as a gate insulating film. In this embodiment, the TFT 600 is a channel etched type transistor manufactured by a method in which the semiconductor layer 602 is also somewhat etched away when the drain electrode 604 and the source electrode 606 are separated by etching. Also, the TFT 600 is an inverted staggered type in which the gate electrode or the gate wiring 100 is disposed below the drain electrode 604 and the source electrode 606.

As apparent from FIG. 1, the drain electrode 604 of the TFT 600 and the drain wiring 200 are formed as a common conductive layer, and the source electrode 606 is coupled with the pixel electrode 300. The TFT 600 having such structure is turned on when a predetermined voltage is applied to the gate wiring 100, and an image signal, that is, a voltage, transmitted through the drain wiring 200 is written into the pixel electrode 300.

When the image signal, that is, the voltage, is written into the pixel electrode 300, a voltage difference is produced between the pixel electrode 300 and the first common electrode 400, and thereby an electric field is produced. This electric field includes not only a component horizontal to the substrate, but also a relatively large component normal to the substrate. This electric field is called a first electric field, to distinguish it from an electric field caused by a second common electrode mentioned later. Therefore, components of the first electric field are called a first horizontal electric field component and a first vertical electric field component.

Continuing an explanation on other components in the TFT substrate 800, a passivation film 806 is formed on the drain electrode 604, the source electrode 606 and the pixel electrode 300, and further an alignment film or layer 808 is applied on the passivation film 806. The direction of aligning treatment of the alignment film 808 is, as shown by a reference number 750 in FIG. 1, a direction at an angle of 75 degrees with the longitudinal direction of the opening portion 304. On the other surface of the first substrate 802, an optical film 810 is stuck. In this embodiment, the optical film 810 comprises a polarizer film, or comprises a polarizer film and an optical compensation film.

On the other hand, the CF substrate 900 comprises, as a main material, a second substrate 902 which is made of a transparent insulating material, similarly to the TFT substrate 800. On one surface of the second substrate 902, there are formed a light shield layer (BM) 904 and a color layer 906. The light shield layer 904 is made of an opaque metal such as Cr and the like, or an opaque organic film such as an acrylic film including carbon. The light shield layer 904 is formed in the peripheral portion of the pixel area, that is, in a area corresponding to the gate wiring 100, the drain wiring 200 and the TFT 600. On the other hand, the color layer is of course used for performing color display, and is disposed mainly in the pixel area.

On the color layer 906, a second common electrode 500 is formed. In this embodiment, the second common electrode 500 is, as apparent from FIG. 2, formed on whole area of the CF substrate 900. The second common electrode 500 is used for producing a second electric field between the second common electrode 500 and the pixel electrode 300, when an image signal is written into the pixel electrode 300. The second electric field has a component approximately normal to the substrate, but, in the vicinity of the pixel electrode 300, has a second horizontal electric field component and a second vertical electric field component.

In this embodiment, the second electric field is produced in this way between the pixel electrode 300 and the second common electrode 500, and also the first electric field is produced between the pixel electrode 300 and the first common electrode 400. These first and second electric fields are superposed each other to obtain an electric field for controlling rotation of liquid crystal molecules. The function of the electric field on liquid crystal molecules and viscoelasticity of the liquid crystal molecules themselves are utilized to rotate the liquid crystal molecules in a plane horizontal to the substrate.

With respect to other components of the CF substrate 900, an alignment layer or film 908 is applied on the second common electrode 500. The direction of the aligning treatment of the alignment layer 908 is, as shown in FIG. 1 by a reference numeral 750, is a direction at an angle of 75 degrees with the longitudinal direction of the opening portion 304. Also, in this embodiment, this alignment layer 908 and the alignment layer 808 on the side of the TFT substrate 800 are both rubbed in the same direction, and as a result thereof liquid crystal molecules 1100 are parallel aligned. However, the present embodiment is not limited to such parallel aligned liquid crystal molecules, but can be antiparallel aligned.

Also, an optical film 910 is stuck on the other surface of the second substrate 902. Similarly to the optical film 810, the optical film 910 comprises a polarizer film, or comprises a polarizer film and an optical compensation film. The polarizer films of this optical film 910 on the side of the CF substrate 900 and of the optical film 810 on the side of the TFT substrate 800 have absorption axes orthogonal with each other, that is, absorption axes of crossed Nicols.

Next, an explanation will be made on a method of manufacturing the liquid crystal display according to this embodiment and having the above-mentioned structure. The explanation will be made from the side of the TFT substrate 800 to the side of the CF substrate 900.

First, on a first substrate 802 made of a transparent material such as glass and the like, gate wirings 100 made of a single layer of metal such as Cr and the like, or of a multilayered metal film such as Cr, ITO and the like are formed by sputtering and photolithography. In this embodiment, a material such as Cr and the like which has lower resistance than ITO is used as a material of gate wirings, and, in the process of forming the gate wirings 100, the auxiliary conductive portion 700 is also formed simultaneously.

The first common electrode 400 made of a transparent conductive film such as ITO and the like is formed by sputtering and photolithography. The first common electrode 400 has a shape as mentioned above. After forming such first common electrode 400, an insulating film 804 constituted of a single layer or a multi-layered film of silicon nitride, silicon oxide and the like is formed, for example, by CVD and photolithography. The insulating film 804 together with the first common electrode 400 and the pixel electrodes 300 form capacitance, as shown in FIG. 3. In order to reduce such capacitance, it is possible to use an organic material such as acrylate and the like in place of the above-mentioned silicon nitride and the like.

Further, in an area on the insulating film 804 over the gate electrode, a semiconductor layer 602 made of amorphous silicon (a-Si, n+a-Si) is formed by CVD and photolithography. Then, the drain electrode 604, the source electrode 606 and drain wiring 200 made of metal of a single layer or a multilayered film of Cr, ITO and the like are formed by sputtering and photolithography. In this photolithography process, the semiconductor layer 602 is also somewhat etched away when the drain electrode 604 and the source electrode 606 are separated by etching and, therefore, the TFT 600 becomes a channel etched type transistor. On the other hand, before sputtering an electrode material of the drain electrode 604, it is possible to form a protect portion at a predetermined area on the semiconductor layer 602 and thereby to avoid etching of the channel region when the drain electrode 604 and the source electrode 606 are separated. By this method, a channel protection type TFT is obtained.

By the process mentioned until now, the gate wirings 100, the drain wirings 200 and TFT's 600 as switching elements disposed at intersections thereof are formed.

After such process, the pixel electrodes 300 made of a transparent conductive film such as ITO and the like is formed by sputtering and photolithography. The opening portions 304 are patterned and formed in this process. In this embodiment, the width of each branch portion 306 of the pixel electrode 300, and the width of each opening portion 304 are respectively 6 $\mu$m. Considering the electric field to be produced, it is preferable that both widths are equal to or smaller than approximately 10 $\mu$m, but it is not always necessary that the width of each branch portion 306 and the width of the opening portion 304 are equal to each other. On the pixel electrode 300 and the TFT 600, a passivation film 806 made of silicon nitride is formed by CVD and photolithography.

With respect to the CF substrate 800, on the second substrate 902 made of transparent material such as glass and the like, there are formed a light shield film or layer 904 of an opaque metal material, for example, Cr and the like, or of an organic material such as acrylate including carbon and the like, and a color layer 906 for performing color display. The areas where these light shield film 904 and the color layer 906 are as mentioned above.

Further, on the color layer 906 and the like, the second common electrode 500 made of a transparent conductive film such as ITO and the like is formed by sputtering and photolithography.

On the opposing surfaces of the TFT substrate 800 and of the CF substrate 900 fabricated in this way, there are formed alignment films 808 and 908, respectively. Each of the alignment films 808 and 908 is constituted of, for example, an organic film such as polyimide and the like. After forming these alignment films 808 and 908, aligning treatment is performed. In this embodiment, polyimide for horizontal alignment SE-7992 (products name) manufactured by Nissan Chemical Industries,. LTD., Japan, was used as a material of these alignment films, and rubbing treatment is performed thereon. In this embodiment, rubbing was performed in the direction shown in FIG. 1 by a reference numeral 750 as parallel rubbing. However, it is also possible to perform rubbing as anti-parallel rubbing. Also, in this embodiment, the aligning treatment was performed such that the alignment direction 750 of liquid crystal molecules and the longitudinal direction of the opening portion 304 have an angle of 75 degrees. However, such angle of aligning treatment is only an example, and the present invention is not limited to such angle. For example, in this embodiment, the angle $\theta$ between the alignment direction of liquid crystal molecules and the longitudinal direction of the opening portion 304 may be in a range between zero and ninety degrees, that is, $0°<\theta<90°$, and not limited to 75 degrees.

Then, the TFT substrate 800 and the CF substrate 900 are disposed parallel such that both alignment layers 808 and 908 oppose each other and a predetermined distance is kept between both substrates 800 and 900. Both substrates 800 and 900 are sealed at the peripheral portion thereof and a space between both substrates 800 and 900 is filled with liquid crystal molecules 1100, thereby a liquid crystal layer 1000 is fabricated. The liquid crystal molecules 1100 are those having a negative anisotropy of permittivity. Especially, in this embodiment, MLC-2038 (product name) manufactured by Merck Japan Limited, is used as the liquid crystal material, and the thickness of the liquid crystal layer 1000 is 4 $\mu$m. In practice, the liquid crystal material MLC-2038 has an anisotropy of refractive index $\Delta n=0.103$, and an anisotropy of permittivity $\Delta\epsilon=-5.0$.

Next, optical films 810 and 910 are stuck on the outside surfaces of the TFT substrate 800 and the CF substrate 900, respectively. Each of the optical film 810 and the optical film 910 comprises a polarizer film, or comprises a polarizer film and an optical compensation film. The polarizer films of this optical film 910 and of the optical film 810 are disposed in the crossed Nicols arrangement. Especially, the optical film 810 stuck on side of the TFT substrate 800 is disposed such that the absorption axis of the optical film 810 is orthogonal to the rubbing direction of the alignment film 808.

In this way, the liquid crystal display, particularly the liquid crystal display panel portion, according to this embodiment can be obtained.

After obtaining such liquid crystal display panel, a voltage supply means which applies the same potential to the first common electrode 400 and the second common electrode 500, and other means such as a drive means usually required in a liquid crystal display are added to the above-mentioned such liquid crystal display panel, thereby the liquid crystal display according to this embodiment is obtained. It is preferable that the potential applied to the first and second common electrodes 400 and 500 is a constant potential voltage. Various structures can be used for providing such potential. For example, as in a general twisted nematic (TN) type liquid crystal display, it is possible to parallel connect both common electrodes at a transfer portion comprising conductive paste and to couple them to a signal outputted from a driver via the transfer portion. In this case, it is preferable that that a means for adjusting the signal, that is, a voltage, outputted from the driver is further provided. Examples of such adjusting means are a variable resistor, a potentiometer and the like.

Figure 4:
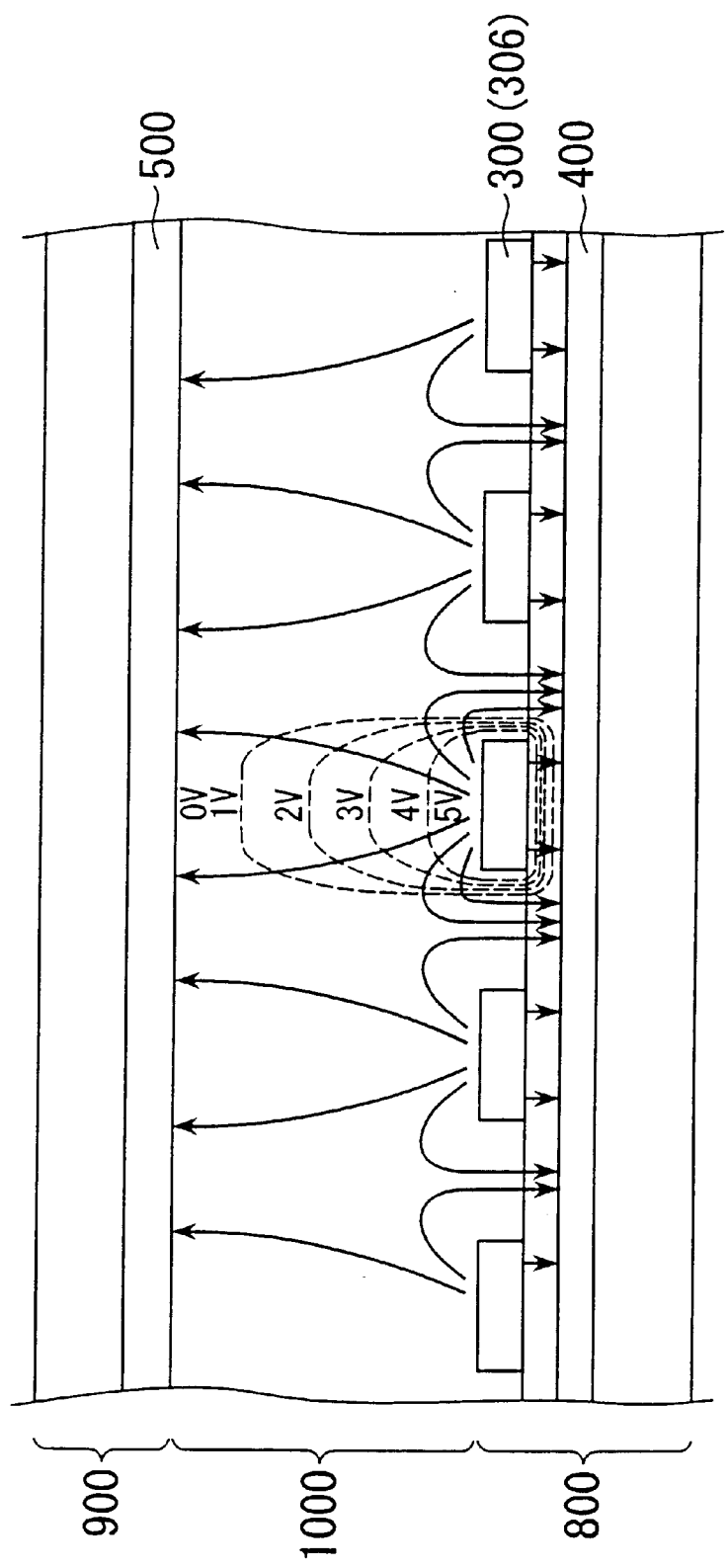
FIG. 4 is a schematic cross sectional view for illustrating the principle of liquid crystal drive operation of the liquid crystal display shown in FIG. 1.

Now, with reference to FIG. 4, an explanation will be made on an operation of the liquid crystal display according to this embodiment fabricated in this way. In FIG. 4, an electric field produced by the first and second common electrodes 400 and 500 and the pixel electrode 300 is clearly shown, and components which are not necessary to show such electric field are omitted.

In FIG. 4, potential voltages are applied to respective electrodes such that a voltage difference is produced between the pixel electrode 300, that is, the branch portions 306, and first common electrode 400 and between the first common electrode 300 and the second common electrode 500. For example, assume that 5 V (volts) is applied to the pixel electrode 300, 0 V is applied to the first common electrode 400, and 0 V is applied to the second common electrode 500. A voltage distribution and main directions of electric field in such case are respectively shown by dotted lines and solid lines with arrows in FIG. 4.

As can be understood from FIG. 4, in the liquid crystal display according to this embodiment, a voltage difference is produced between electrodes disposed in a direction perpendicular to the surface of the substrate, and thereby an electric field is produced mainly in the direction perpendicular to the surface of the substrate.

However, it should be noted that, in the liquid crystal display according to this embodiment, there are regions where potential varies abruptly in a direction parallel to the surface of the substrate. As seen from FIG. 4, equipotential lines of 1 V through 4 V densely appear around the edge portions of the branch portion 306 of each pixel electrode 300. Also, with respect to the relationship between the equipotential lines and an electrode structure, the regions where such equipotential lines appear densely include regions where the first common electrode 400 and the pixel electrodes 300 overlap each other. In this way, since there are overlapped portions between the first common electrode 400 and the pixel electrodes 300, an electric field is produced in the insulating film between the pixel electrode 300 and the first common electrode 400 as shown by short arrows. The portion where the first common electrode 400 and the pixel electrode 300 overlap each other functions to broaden or extend portions near the pixel electrode 300 where the equipotential lines are densely appear and where electric fields appear horizontally to the substrate, in a direction perpendicular to the substrate, that is, in a direction of height of the liquid crystal layer 1000.

The electric field which appears in regions near the pixel electrode 300 and which is horizontal to the substrate is stronger than that of other regions, because a voltage difference is relatively large with respect to a distance. Therefore, in the vicinity of the pixel electrodes 300, it is possible to stably control the alignment direction of liquid crystal molecules 1100. In other words, even if a potential difference between electrodes is relatively small, it is possible to control the alignment direction of the liquid crystal molecules in that region.

In addition to this, the liquid crystal molecules have a property of giving influence on each other with respect to the alignment thereof. Therefore, the above-mentioned stable alignment regions which are produced not only in the vicinity of the pixel electrode 300 but also produced widely in the direction of height of the liquid crystal layer 1000 function as nuclei, and propagate the alignment direction toward liquid crystal molecules existing at a portion over the center of each pixel electrode 300, at a central portion between the pixel electrodes 300 and the like. Such operation is more surely performed, as the voltage applied to each of the pixel electrodes 300 becomes large. In other words, the alignment direction of liquid crystal molecules controlled in the vicinity of the pixel electrode 300 propagates to other portions, and as a result thereof liquid crystal molecules rotate to a direction perpendicular to the surface of the sheet of FIG. 4 depending on the electric field produced near the pixel electrode 300, and quantity of light passing through the liquid crystal display panel is increased accordingly. That is, a gray shades display can be performed according to the voltage applied to each pixel electrode.

It is preferable that the voltages applied to the first common electrode 400 and the second common electrode 500 are respectively constant values. By using a voltage supply means which can supply such voltages, it is easily possible to apply the invention to a general active matrix type liquid crystal display. Also, by supplying the same voltage to the first common electrode 400 and the second common electrode 500, a liquid crystal display having a simpler structure can be realized. When the potential of the common electrodes is not constant, a flicker of display may occur. However, for example, by changing the voltage when a medium tone is displayed, it is possible to improve the flicker of display. Also, it is possible to improve the flicker of display when other tone is displayed, in that potential.

In order to give more thorough understanding of an operation and the like of the liquid crystal display according to this embodiment, an explanation will be made on a general structure of a conventional IPS mode liquid crystal display, which is hereafter referred to as a comparative example, with reference to FIG. 5 and FIG. 6. Also, comparison is made between such comparative example and the liquid crystal display according to this embodiment mentioned above.

Figure 5:
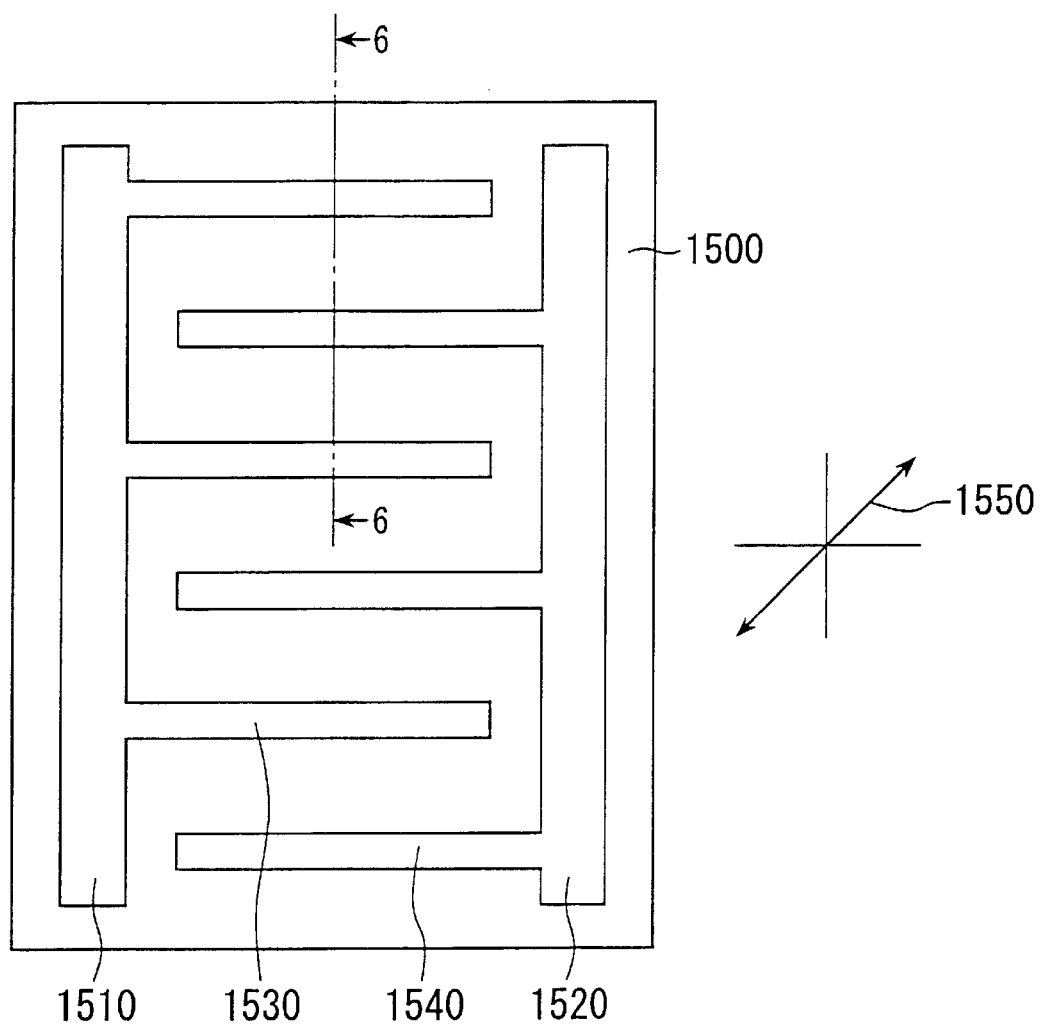
FIG. 5 is is a partial front view showing a structure of a liquid crystal display panel of a liquid crystal display as a comparative example.
Figure 6:
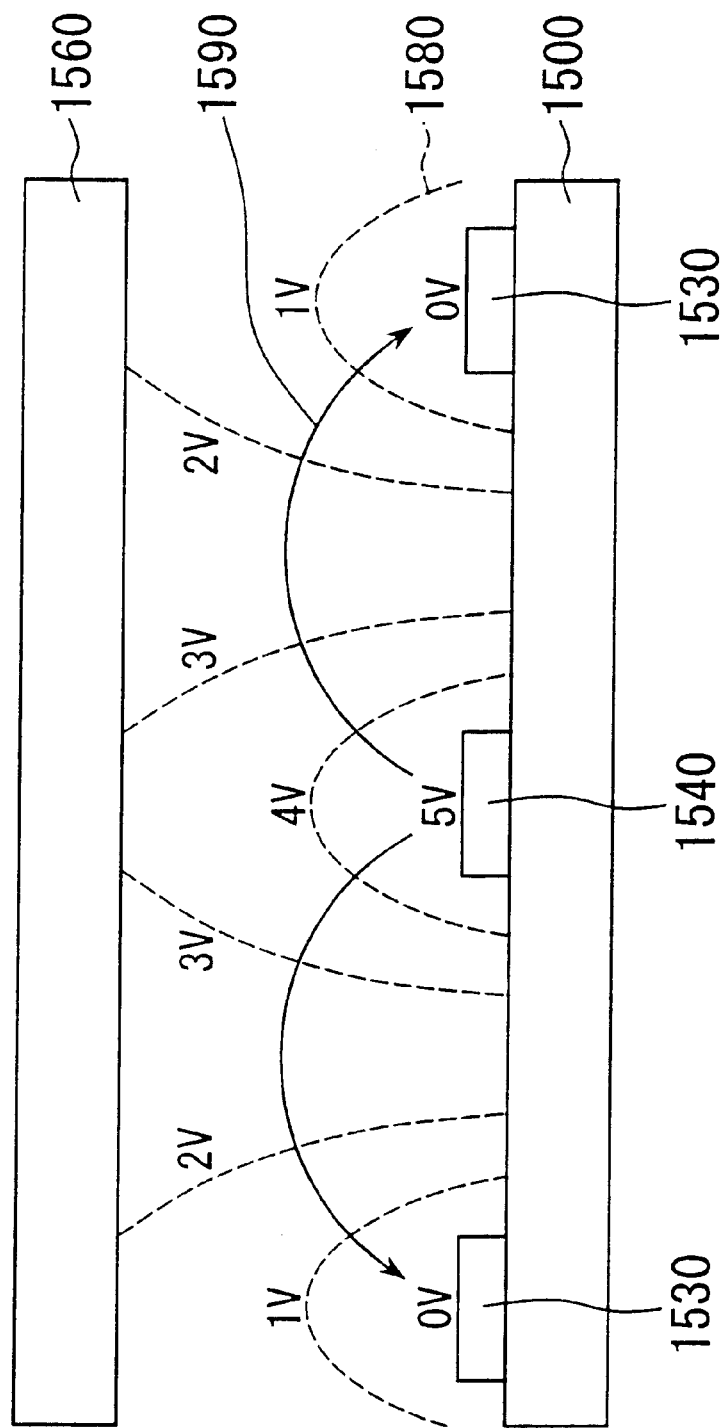
FIG. 6 is a partial cross sectional view taken on line 6-6 of FIG. 5.

As shown in FIG. 5 and FIG. 6, the liquid crystal display of the comparative example comprises a pair of substrates, that is, a first substrate 1500 and a second substrate 1560. On the first substrate 1500, there are formed a comb shaped first electrode 1510 and a comb shaped second electrode 1520, which are disposed such that tooth portions 1530 and 1540 of respective electrodes are interleaved with each other at constant spaces. Here, it should be noted that since, in the conventional IPS mode, an electric field horizontal with the substrate is produced between the tooth portion 1530 and the tooth portion 1540, it is necessary in structue that each space between the tooth portions becomes relatively wide. Also, in order to obtain a predetermined aperture rate, the width of each tooth portion of the comb shaped electrode inevitably becomes narrower than the space between the tooth portions. Further, on the second substrate 1560, basically, no electrode is provided.

In the liquid crystal display having such structure, a predetermined voltage difference is applied to the first electrode 1510 and the second electrode 1520, and an electric field is produced accordingly. In FIG. 6, a distribution of equipotential lines and main directions of the electric field are shown, in a condition 5 V is applied to the first electrode and 0 V is applied to the second electrode.

As can be seen from FIG. 6, in the liquid crystal display of comparative example, a voltage difference is given between the tooth portions 1530 and 1540 which are disposed parallel to each other in the same plane, and an electric field is produced in a direction perpendicular to the longitudinal direction of the tooth portions 1530 and 1540 and parallel to the substrate surface.

When compared FIG. 6 with the above-mentioned FIG. 4, it is apparent that the distribution of equipotential lines differs from each other. In the distribution of equipotential lines shown in FIG. 4, an area having steep electric field is wider than that in the distribution of FIG. 6. That is, in the liquid crystal display according to this embodiment, it is possible to more efficiently control the alignment direction of liquid crystal molecules, when compared with the conventional liquid crystal display having IPS mode. As a result thereof, according to this embodiment, it is possible to obtain better display characteristics than those of the liquid crystal display having the conventional structure.

Also, in the liquid crystal display according to the present embodiment, the area in which electric field changes steeply in a direction parallel to the substrate extends from the edge portion of the pixel electrode 300 in the direction of height of the liquid crystal layer. Therefore, as mentioned above, the alignment direction of liquid crystal molecules can be stably controlled even when the drive voltage is relatively low. Further, such stable alignment direction becomes nuclei for defining the alignment direction of liquid crystal molecules in the whole display area, and, therefore, the direction of rotation of liquid crystal molecules in the display area is unified, so that dispersion of display characteristics can be suppressed.

Additionally, the liquid crystal display according to this embodiment is easily applied to a general active matrix type liquid crystal display. This is because, it is possible to apply constant voltages to the first common electrode 400 and the second common electrode 500, or to apply the same voltage to these common electrodes 400 and 500, and it is not so difficult to provide a means for applying such voltage or voltages. Also, only one switching element for controlling application of a voltage is required to couple with each pixel electrode 300. By using such structure, it is possible to obtain superior display characteristics in a general liquid crystal display which uses a dot-inversion drive system or a gate line-inversion drive system.

As another advantage of the liquid crystal display according to this embodiment, the flicker of display is improved. This is because, the same potential voltage is applied to the first common electrode 400 and the second common electrode 500, and also the potential voltage is made adjustable. That is, by adjusting the potential voltage of the first common electrode 400 and the second common electrode 500, it is possible to obtain a condition in which the flicker of display is minimized.

In the liquid crystal display according to the present embodiment, since the second common electrode 500 disposed on the side of the CF substrate 900 shields the color layer 906 from the electric field produced in the liquid crystal layer 1000, the color layer 906 is not affected by such electric field. Therefore, the above-mentioned problems of the Prior Art Example 1 through Prior Art Example 8 do not occur in the liquid crystal display according to the present embodiment. That is, according to this embodiment, it is possible to improve deterioration of the display characteristics such as image retention and the like.

Also, in the liquid crystal display according to this embodiment, the auxiliary conductive portion 700 which is made of conductive material having a low resistivity is provided for the first common electrode 400 made of transparent conductive material which generally has a high resistivity such as ITO and the like. Therefore, it is possible to make the potential of the first common electrode 400 stable. Also, it is possible to form such auxiliary conductive portion 700 simultaneously with the formation of the gate electrode, in a process of forming the gate electrode. This means that, according to this embodiment, a structure for producing an electric field stably can be fabricated without complicating the manufacturing process.

Still further, the liquid crystal display according to this embodiment has a structure in which the alignment direction of liquid crystal molecules can be controlled in whole area on the electrode. Also, each electrode of the pixel electrode 300, the first common electrode 400 and second common electrode 500 is formed of transparent conductive material, and light transmitting the liquid crystal display panel can be efficiently utilized. That is, according to this embodiment, it is possible to improve transmittance of the liquid crystal display.

[Embodiment 2]

Figure 7:
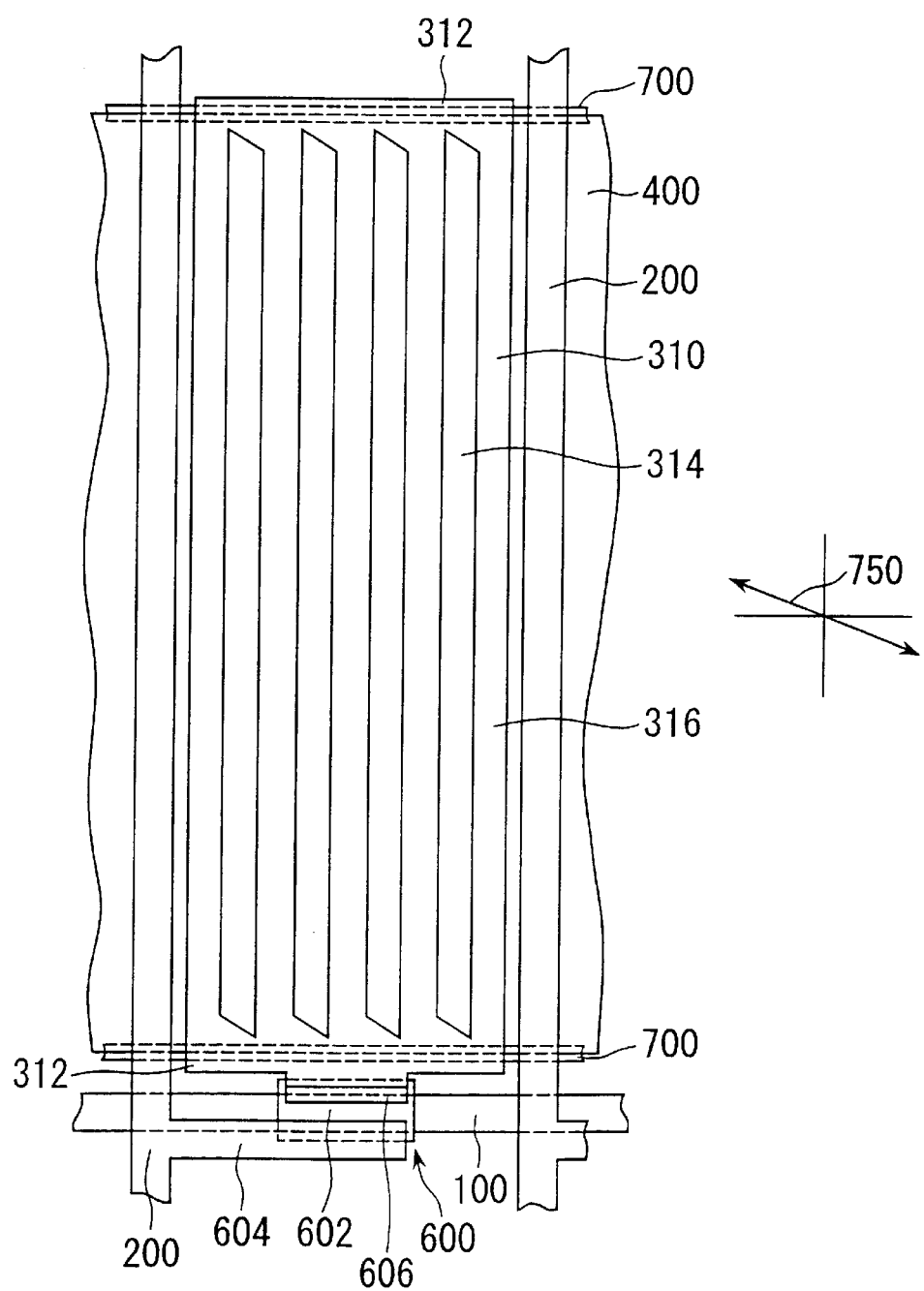
FIG. 7 is a partial front view showing a structure of a liquid crystal display panel of a liquid crystal display according to a second embodiment of the present invention.
Figure 8:
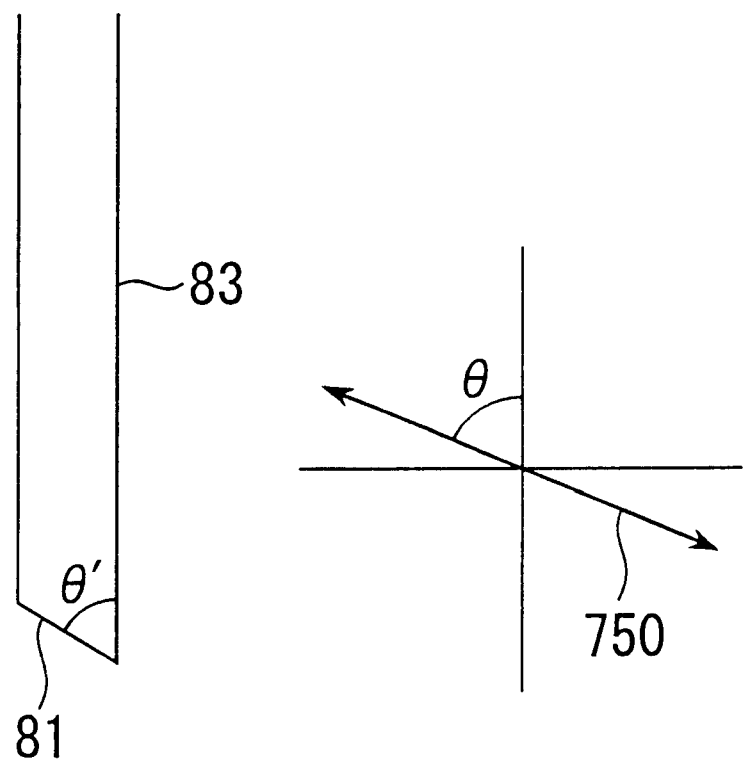
FIG. 8 is a schematic view for illustrating a relationship between a shape of an end portion of an opening portion and an alignment direction of liquid crystal molecules.

FIG. 7 and FIG. 8 show a liquid crystal display according to the second embodiment of the present invention. Especially, as can be understood by comparing FIG. 7 with FIG. 1, the liquid crystal display according to the second embodiment is a variation of the above-mentioned liquid crystal display according to the first embodiment. Therefore, in FIG. 7, components similar to those of the first embodiment are designated by the corresponding reference numerals used in FIG. 1, and description thereof is omitted here.

As apparent from FIG. 7, in the liquid crystal display according to the second embodiment, the shape of each of opening portions 314 of each pixel electrode 310 is changed from that of the liquid crystal display according to the first embodiment.

In the above-mentioned liquid crystal display according to the first embodiment, the shape of each opening portion 304 is rectangle. When the shape of the opening portion is rectangle, there is a possibility that inappropriate alignment is produced on the periphery of each edge portion of the longitudinal direction of the opening portion. More particularly, when the opening portions each having such rectangular shape are used, there is a possibility that the direction in which liquid crystal molecules are rotated by an electric field produced on the side of each long side of the opening portion and the direction in which liquid crystal molecules are rotated by an electric field produced on the side of each short side of the opening portion become opposite to each other. Therefore, there is a possibility that an area having inappropriate or defective alignment appears in the vicinity of the short side of the opening portion.

In order to avoid such problem, the pixel electrode 310 of the liquid crystal display according to the second embodiment has opening portions 314 each having parallelogram shape whose long sides are disposed along an up and down direction of the liquid crystal display panel.

As shown in FIG. 8, the angle θ' between the long side and the short side of such parallelogram shape is selected to become smaller than the angle θ between the alignment direction of the liquid crystal molecules and the long side. That is, θ'<θ. In practice, in the second embodiment, the angle θ is 75 degrees, which is the same as in the first embodiment, and the angle θ' is 70 degrees. As mentioned above, the angle θ is selectable in a range between zero and ninety degrees, that is, 0°<θ<90°. Therefore, the angle θ' is also selectable in accordance with the angle θ.

In the liquid crystal display having such structure, in addition to the advantageous effects obtained in the abovementioned the first embodiment, it is possible to avoid the possibility of occurrence of inappropriate alignment or alignment defect at the edge portions of the longitudinal direction of each opening portion 313, because each opening portion 314 has a parallelogram shape.

As an example, data are given below on the display characteristics of the liquid crystal display according to this embodiment and the conventional liquid crystal display having IPS mode.

By using the structure according to the second embodiment mentioned above, a liquid crystal display was fabricated in which the size of one pixel is 240 μm (in length) by 80 μm (in width), and the number of pixels was 600 (vertical direction) by (800×3)(horizontal direction). The area in which an image contrast ratio is equal to or larger than 100 was the viewing angle area having 88 degrees in up and down direction and 120 degrees in right and left direction. Also, the transmittance was 4.2 percent.

On the other hand, by using a general structure of a conventional IPS type liquid crystal display, a liquid crystal display was fabricated in which the size of one pixel is 240 μm (in length) by 80 μm (in width), and the number of pixels was 600 (vertical direction) by (800×3)(horizontal direction), and in which a width of an electrode was 3.5 μm and a space between the electrodes was 8.5 μm. The area in which an image contrast ratio is equal to or larger than 100 was the viewing angle area having 76 degrees in up and down direction and 91 degrees in right and left direction. Also, the transmittance was 3.0 percent.

As apparent from these data, in the liquid crystal display according to this embodiment, it is possible to obtain wider viewing angle characteristics and high transmittance characteristics, when compared with the conventional liquid crystal display having IPS system.

[Embodiment 3]

Figure 9:
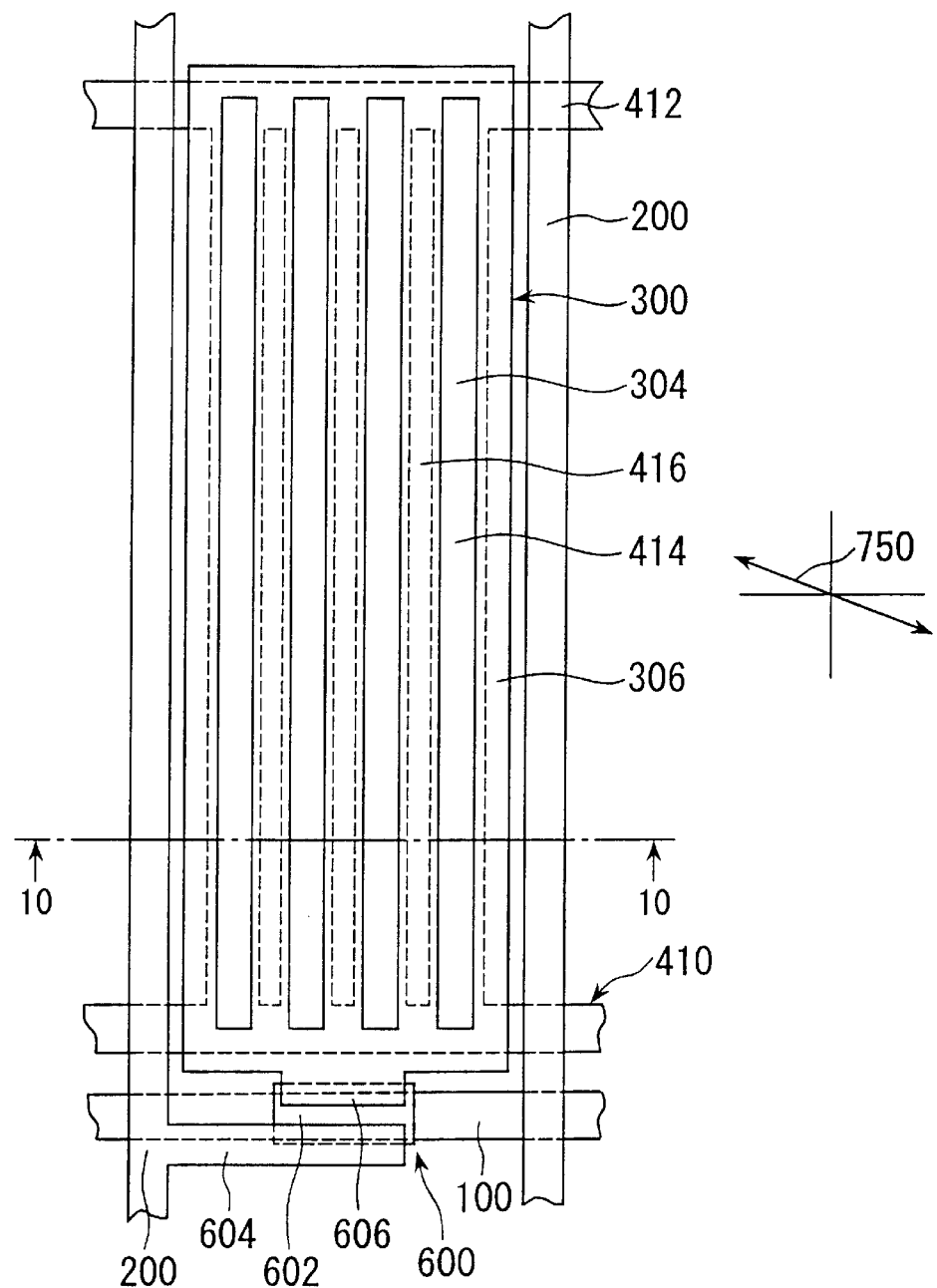
FIG. 9 is a partial front view showing a structure of a liquid crystal display panel of a liquid crystal display according to a third embodiment of the present invention.
Figure 10:
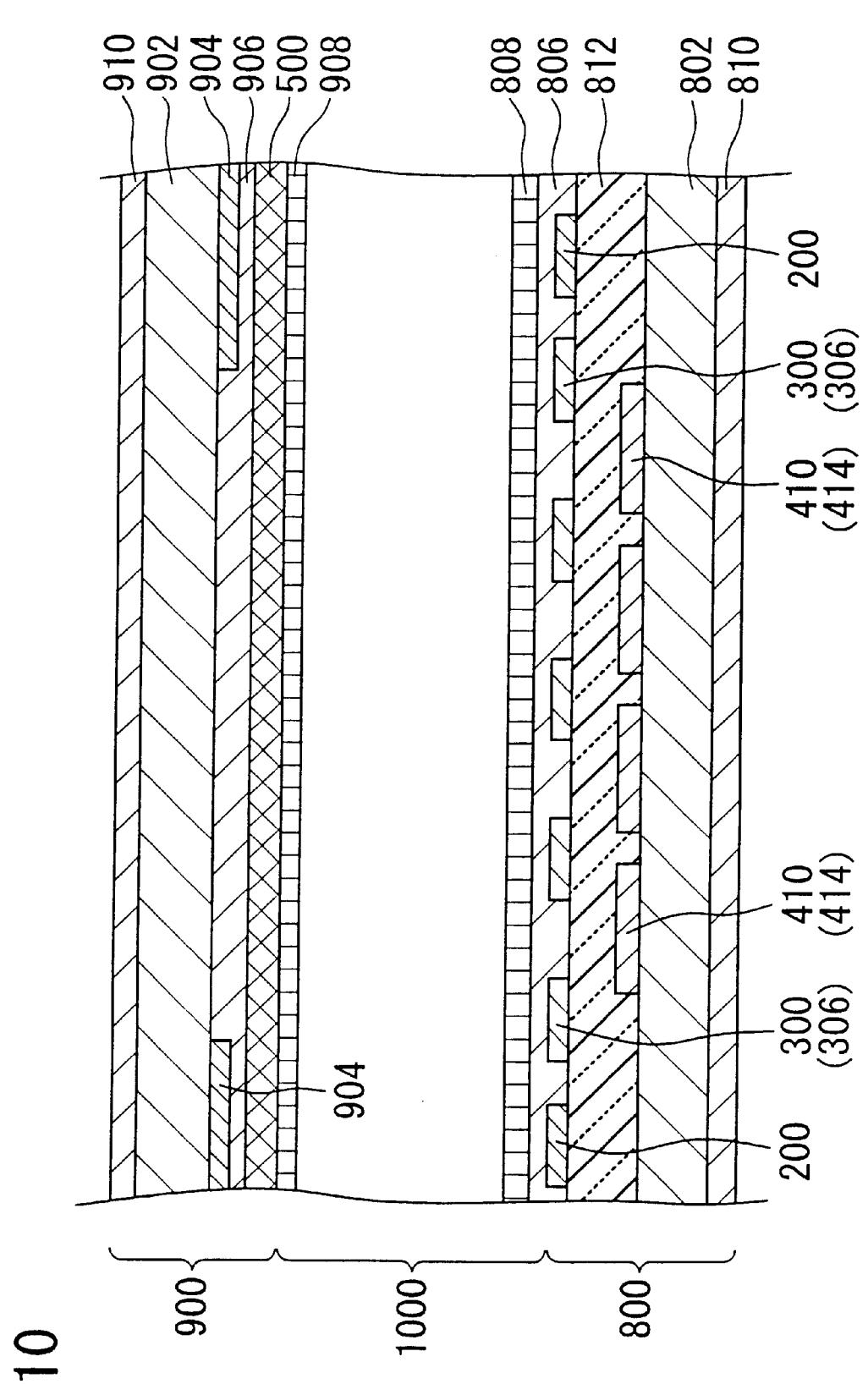
FIG. 10 is a partial cross sectional view taken on line 9—9 of FIG. 9.

FIG. 9 and FIG. 10 show a liquid crystal display according to the third embodiment of the present invention. Especially, as can be understood by comparing these FIG. 9 and FIG. 10 with FIG. 1 through FIG. 3, the liquid crystal display according to the third embodiment is a variation of the above-mentioned liquid crystal display according to the first embodiment. Therefore, in FIG. 9 and FIG. 10, components similar to those of the first embodiment are designated by the corresponding reference numerals used in FIG. 1 through FIG. 3, and description thereof is omitted here.

As apparent from FIG. 9 and FIG. 10, in the liquid crystal display according to the third embodiment, the auxiliary conductive portion 700 used in the liquid crystal display according to the first embodiment is not used, but different structure is used for a first common electrode.

The first common electrode 410 in the liquid crystal display according to the third embodiment has, as shown in the drawings, common electrode side opening portions 416. These common electrode side opening portions 416 are disposed in areas corresponding to portions below the branch portions 306 of the pixel electrode 300. However, in this case, edge portions in the width direction of the branch portions 306 ( ) and the first common electrode 410 partially overlap each other. In other words, the common electrode side opening portions 416 are disposed in the regions corresponding to portions below the branch portions 306 such that the branch portions 306 and the first common electrode 410 have partially overlapped regions. Also, as shown in the drawings, the shape of each of the common electrode side opening portions is a rectangle whose long sides extend along a direction in which the branch portions 306 extend, that is, along an up and down direction of the liquid crystal display panel. These common electrode side opening portions 416 can be simultaneously formed in the photolithography process for forming the first common electrode 410.

In the liquid crystal display according to this embodiment, a display operation can be performed based on the principle similar to that of the first embodiment mentioned above.

Also, in this embodiment, when compared with the liquid crystal display according to the first embodiment, it is possible to stably apply a potential of each pixel electrode, and, therefore, display characteristics can be further improved. Such advantageous effect becomes prominent when the liquid crystal display is driven by using the dot-inverted drive system or the gate line-inverted drive system. When the liquid crystal display is driven by using generally known dot-inversion system or gate line-inverted drive system, polarity of a potential voltage applied to a pixel electrode 300 is inverted as time passes. In such case, if capacitance for electric charges between the pixel electrode 300 and the first common electrode 400 is too large, switching operation of the potential is hindered by the capacitance. In the liquid crystal display according to this embodiment, since the first common electrode 410 has the common electrode side opening portions 416, an overlapped area between the pixel electrode 300 and the first common electrode 410 can be reduced and thereby the capacitance between these electrodes can be decreased. Therefore, as mentioned above, according to this embodiment, it is possible to further improve display characteristics.

As mentioned above, in the first embodiment, the overlapped area between the pixel electrode 300 and the first common electrode 400 contributes to generating the potential distribution for stable control of the alignment direction of liquid crystal molecules. In this embodiment, as shown in FIG. 9 and FIG. 10, the edge portions in the width direction of the branch portion 306 in each pixel electrode 300 overlap the first common electrode 410 and, therefore, it is possible to generate a potential distribution for stable control of the alignment direction of liquid crystal molecules, similarly to the first embodiment.

In the above, an explanation is made on the liquid crystal display which does not have auxiliary conductive portions. However, in the third embodiment, it is also possible to provide the auxiliary conductive portions in a manner similar to the liquid crystal display according to the first embodiment.

Also, in the liquid crystal display according to the third embodiment, each pixel electrode has the opening portions of rectangular shape. However, it is possible to use the opening portions each having parallelogram shape like that of the opening portions of the second embodiment. By using the pixel electrode having such shape, it is possible to obtain the advantageous effect provided by the second embodiment, in addition to the above-mentioned effect of this embodiment.

[Embodiment 4]

Figure 11:
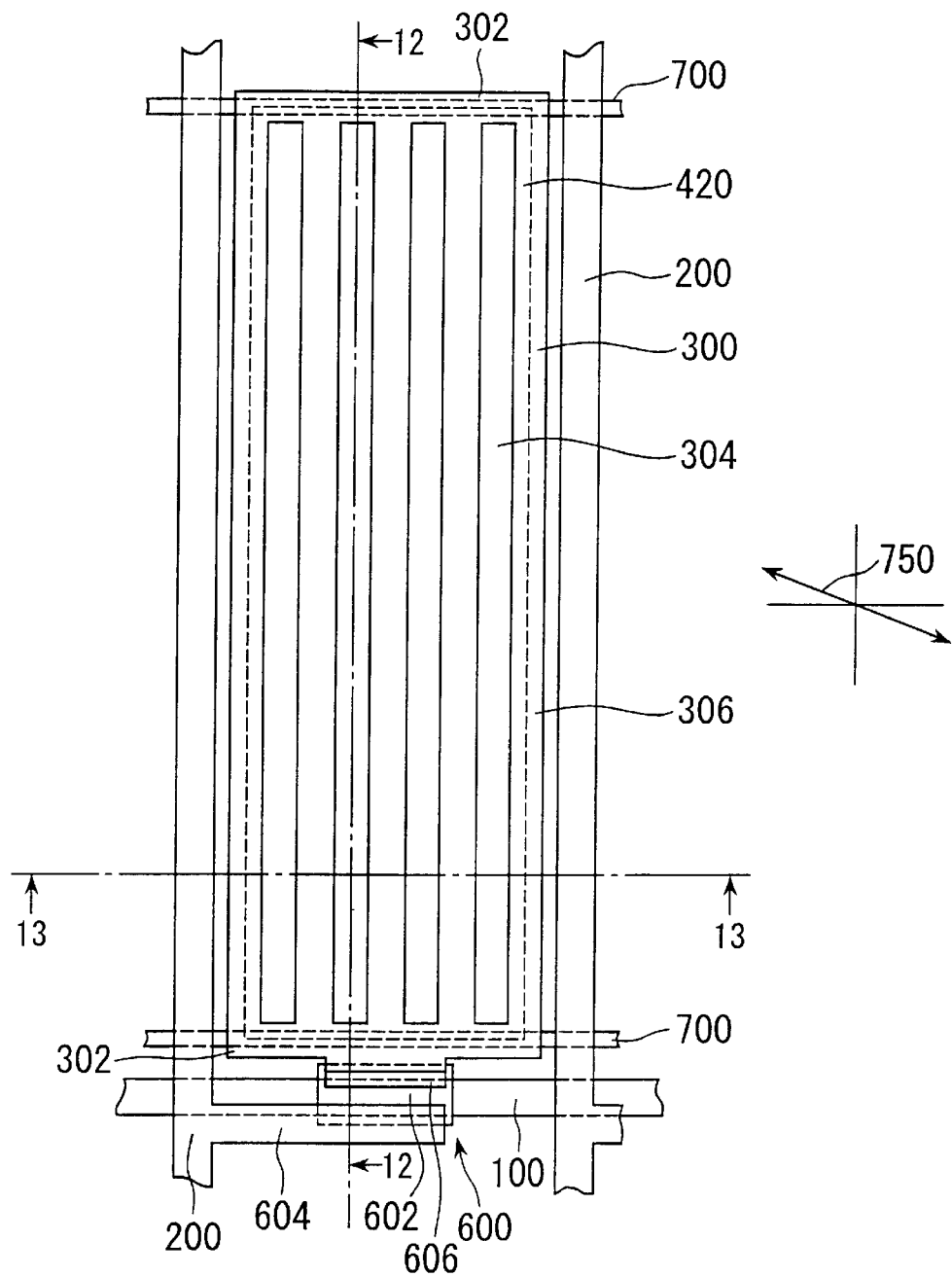
FIG. 11 is a partial front view showing a structure of a liquid crystal display panel of a liquid crystal display according to a fourth embodiment of the present invention.
Figure 12:
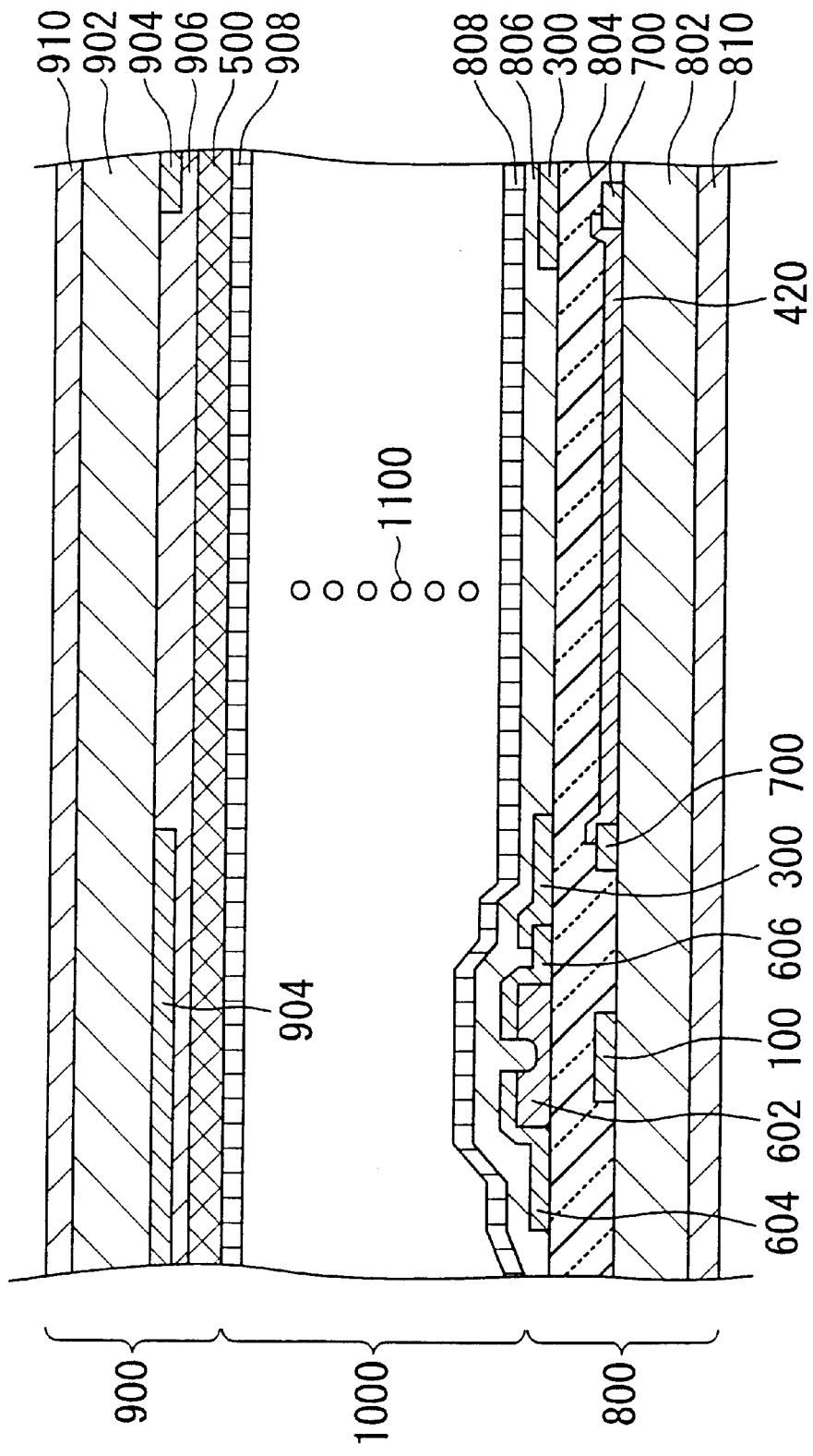
FIG. 12 is a partial cross sectional view taken on line 12—12 of FIG. 11.
Figure 13:
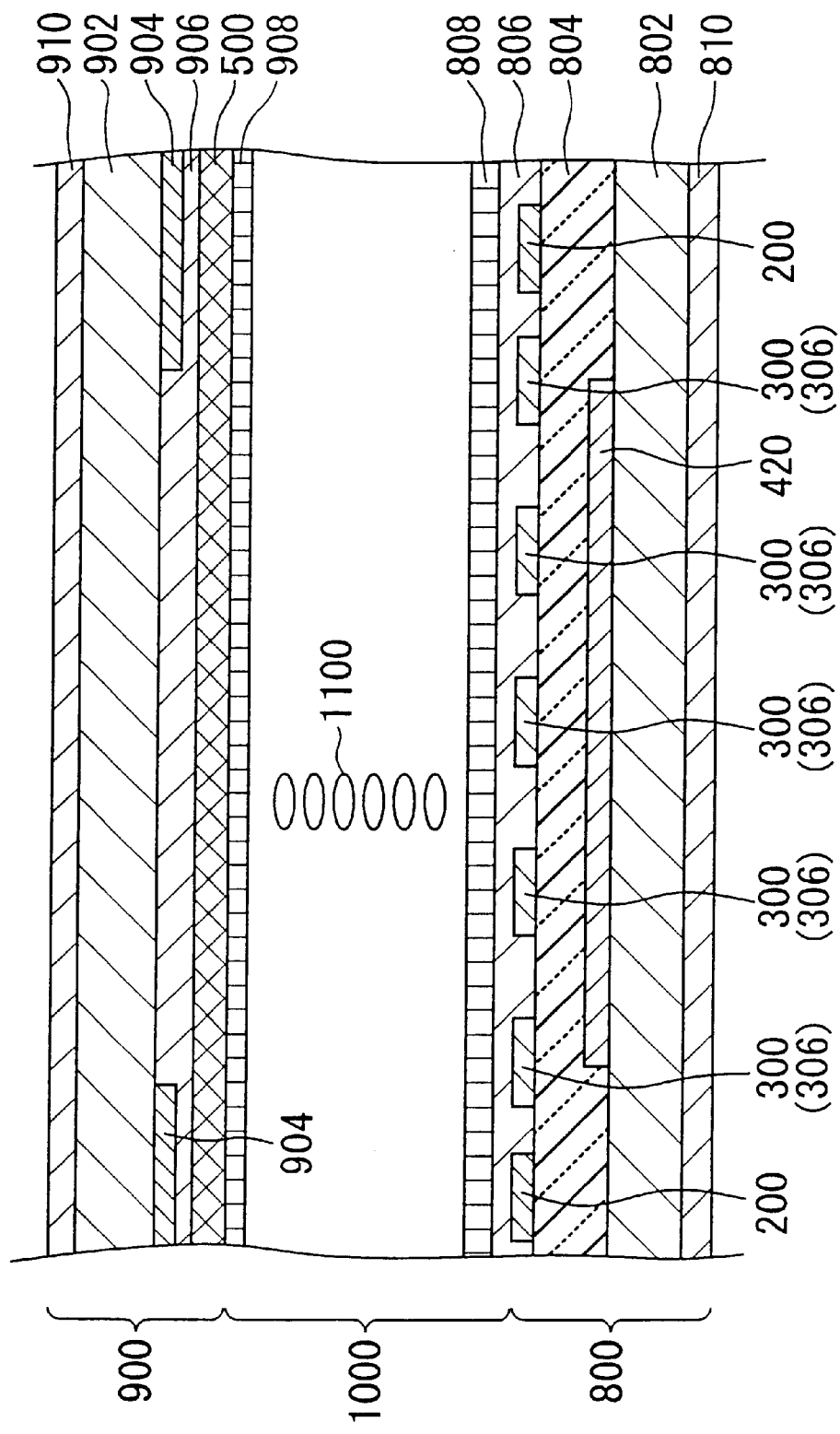
FIG. 13 is a partial cross sectional view taken on line 13—13 of FIG. 11.

FIG. 11 through FIG. 13 show a liquid crystal display according to the fourth embodiment of the present invention. Especially, as can be understood by comparing these FIG. 11 through FIG. 13 with FIG. 1 through FIG. 3, the liquid crystal display according to the fourth embodiment is a variation of the above-mentioned liquid crystal display according to the first embodiment. Therefore, in FIG. 11 through FIG. 13, components similar to those of the first embodiment are designated by the corresponding reference numerals used in FIG. 1 through FIG. 3, and description thereof is omitted here.

In the above-mentioned first embodiment, the first common electrode 400 is formed continuously along the pixels disposed in right and left direction of the liquid crystal display panel. Therefore, the drain wiring and a part of the first common electrode 400 existing below the drain wiring 200 via the insulating film form a capacitor. Thus, there is a possibility that the potential of the first common electrode becomes unstable due to an image signal passing through the drain wiring 200, and that the potential of each pixel also becomes unstable.

Therefore, in the fourth embodiment, the electrode pattern of a first common electrode 420 is changed to avoid the problems mentioned above. That is, in this embodiment, the first common electrode 420 is constituted of separate electrode portions corresponding to respective pixel areas.

As a result, as shown in FIG. 11 and FIG. 13, it is possible to remove overlapped areas between the first common electrode 420 and the drain wirings 200. Therefore, the capacitance between the drain wirings 200 and the first common electrode 400 becomes much smaller than that of the fist embodiment, and it is possible to apply a potential voltage to each pixel stably.

In this case, in order for the liquid crystal display according to this embodiment to function properly, it is necessary that the separate electrode portions of the first common electrode 420 must have the same potential, and these electrode portions must be electrically connected together. Therefore, auxiliary conductive portions 700 used in the first embodiment are also used in this embodiment.

It should be noted that, in this embodiment, it is possible to obtain the effect of the first embodiment, as well as the effect of stable application of the pixel voltage.

It is also possible to mutually combine the first through fourth embodiments mentioned above.

Figure 14:
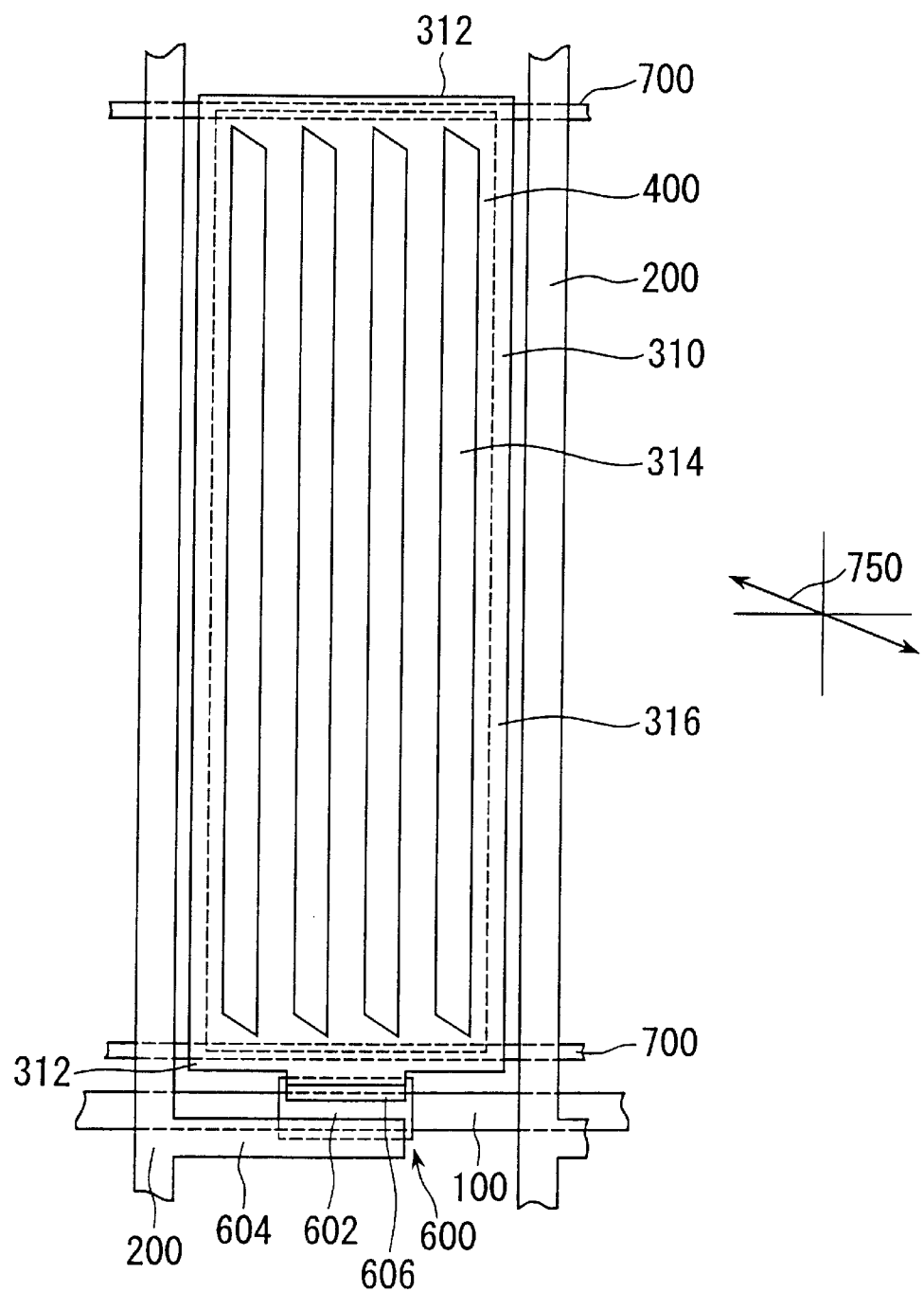
FIG. 14 is a partial front view showing a structure of a liquid crystal display panel of a liquid crystal display according to a combination of the first, second and fourth embodiments of the present invention.

For example, by applying modification according to the second and fourth embodiments to the first embodiment, it is possible to obtain a liquid crystal display having an electrode structure shown in FIG. 14. Such liquid crystal display comprises pixel electrodes 310 each having parallelogram shaped opening portions 314, trunk portions 312 and branch portions 316. The liquid crystal display also comprises a first common electrode portion 420 provided for each pixel, and auxiliary conductive portions which extend in a right and left direction of the liquid crystal display panel and which couple the first common electrode portions adjacently disposed in the right and left direction of the liquid crystal display panel. The liquid crystal display having these pixel electrodes 310, the first common electrode portions 420 and the auxiliary conductive portions 700 provides all the effects obtained by the first, second and fourth embodiments.

Figure 15:
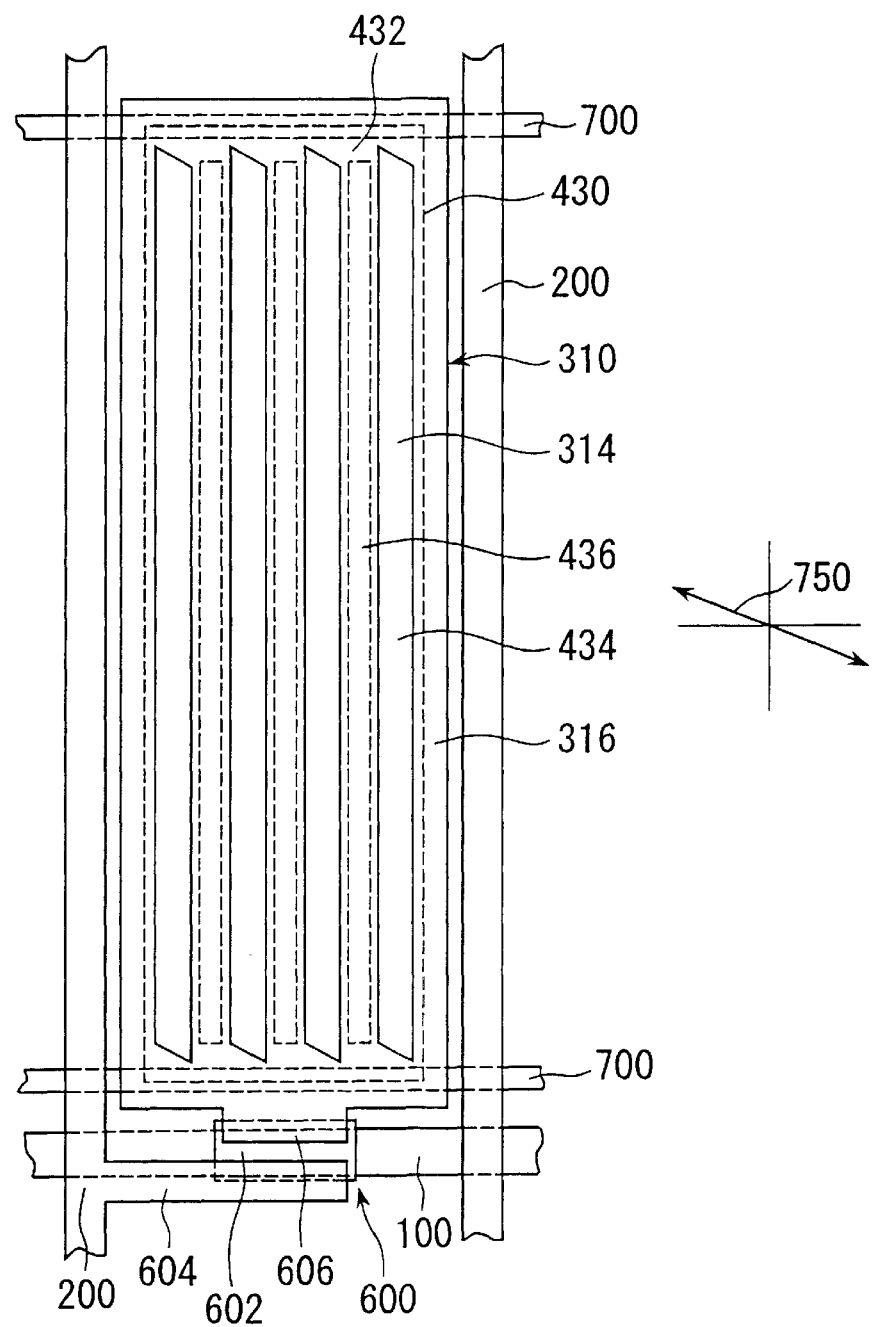
FIG. 15 is a partial front view showing a structure of a liquid crystal display panel of a liquid crystal display according to a combination of the first through fourth embodiments of the present invention.

Also, by applying modification according to the second through fourth embodiments to the first embodiment, it is possible to obtain a liquid crystal display having an electrode structure shown in FIG. 15. Such liquid crystal display comprises pixel electrodes 310 each having parallelogram shaped opening portions 314, trunk portions 312 and branch portions 316. The liquid crystal display also comprises a first common electrode portion 430 each having common electrode side opening portions 436 and provided for each pixel, and auxiliary conductive portions which extend in a right and left direction of the liquid crystal display panel and which couple the first common electrode portions adjacently disposed in the right and left direction of the liquid crystal display panel. The liquid crystal display having these pixel electrodes 310, the first common electrode portions 430 and the auxiliary conductive portions 700 provides all the effects obtained by the first through fourth embodiments.

Further, other combinations not described here can be used, and, in such cases, advantageous effects are obtained accordingly.

[Embodiment 5]

Figure 16:
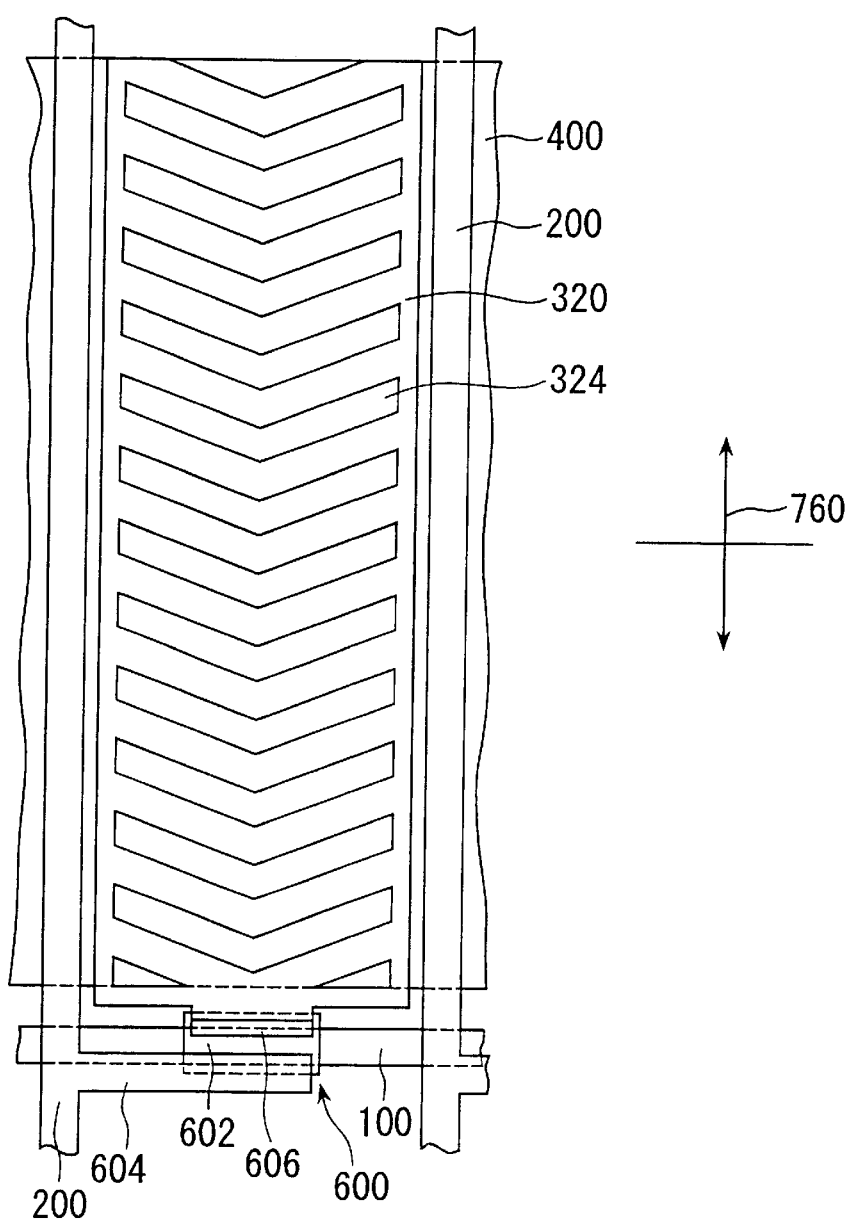
FIG. 16 is a partial front view showing a structure of a liquid crystal display panel of a liquid crystal display according to a fifth embodiment of the present invention.

FIG. 16 shows a liquid crystal display according to the fifth embodiment of the present invention. Especially, as can be understood by comparing FIG. 16 and FIG. 10 with FIG. 1, the liquid crystal display according to the fifth embodiment is a variation of the above-mentioned liquid crystal display according to the first embodiment. Therefore, in FIG. 16, components similar to those of the first embodiment are designated by the corresponding reference numerals used in FIG. 1 through FIG. 3, and description thereof is omitted here.

As apparent from FIG. 16, the liquid crystal display according to this embodiment has a characteristic shape of each pixel electrode 320.

The pixel electrode 320 has a plurality of V-shaped opening portions 324 which are disposed in the direction perpendicular to the direction of a gate wiring 100. More particularly, each of the V-shaped opening portions 324 has short sides located along the direction perpendicular to the gate wiring 100, and is composed by combining two parallelograms which share a short side with each other and whose long sides are disposed symmetrically with respect to the center line of the pixel electrode 320 perpendicular to the gate wiring 100.

In other words, each of the pixel electrodes 320 comprises a pair of parallel trunk portions disposed in the direction perpendicular to the gate wiring 100, and a plurality of V-shaped non-opening portions coupling the pair of parallel trunk portions together. The above-mentioned V-shaped opening portions 324 are located between the V-shaped non-opening portions.

Also, in this embodiment, the alignment direction of liquid crystal molecules is determined to be a direction of the short side of the V-shaped opening portions 324, that is, the direction perpendicular to the gate wiring 100, as shown by a reference numeral 760 in FIG. 16.

By using the pixel electrodes 320 each having the above-mentioned shape, and by determining the initial alignment direction of liquid crystal molecules as shown in the drawing, the liquid crystal molecules rotates toward different directions which are different from each other in left half and right half portions of the pixel area, when an image signal is written into the pixel electrode 320.

Therefore, in this embodiment, it is possible to obtain superior display characteristics. More particularly, the areas having different rotational directions of liquid crystal molecules have mutually different viewing angle characteristics. Since the areas having such different viewing angle characteristics are provided in each one pixel, the viewing angle characteristics are mutually compensated, so that variation of display characteristics when the viewing angle is changed can be suppressed and superior display characteristics can be obtained.

In the structure of FIG. 16, an auxiliary conductive portion 700 is not provided. However, it is possible to use such auxiliary conductive portion 700 and, in addition to this, to divide the first common electrode into separate common electrode portions corresponding to respective pixel areas. Also, the first common electrode 400 shown in FIG. 16 does not have common electrode side opening portions. However, it is possible to provide such common electrode side opening portions, as long as non-opening portions of the pixel electrode 320 and the first common electrode 400 overlap each other at end portions in the width direction of the non-opening portions, in a manner similar to the third embodiment.

[Embodiment 6]

Figure 17:
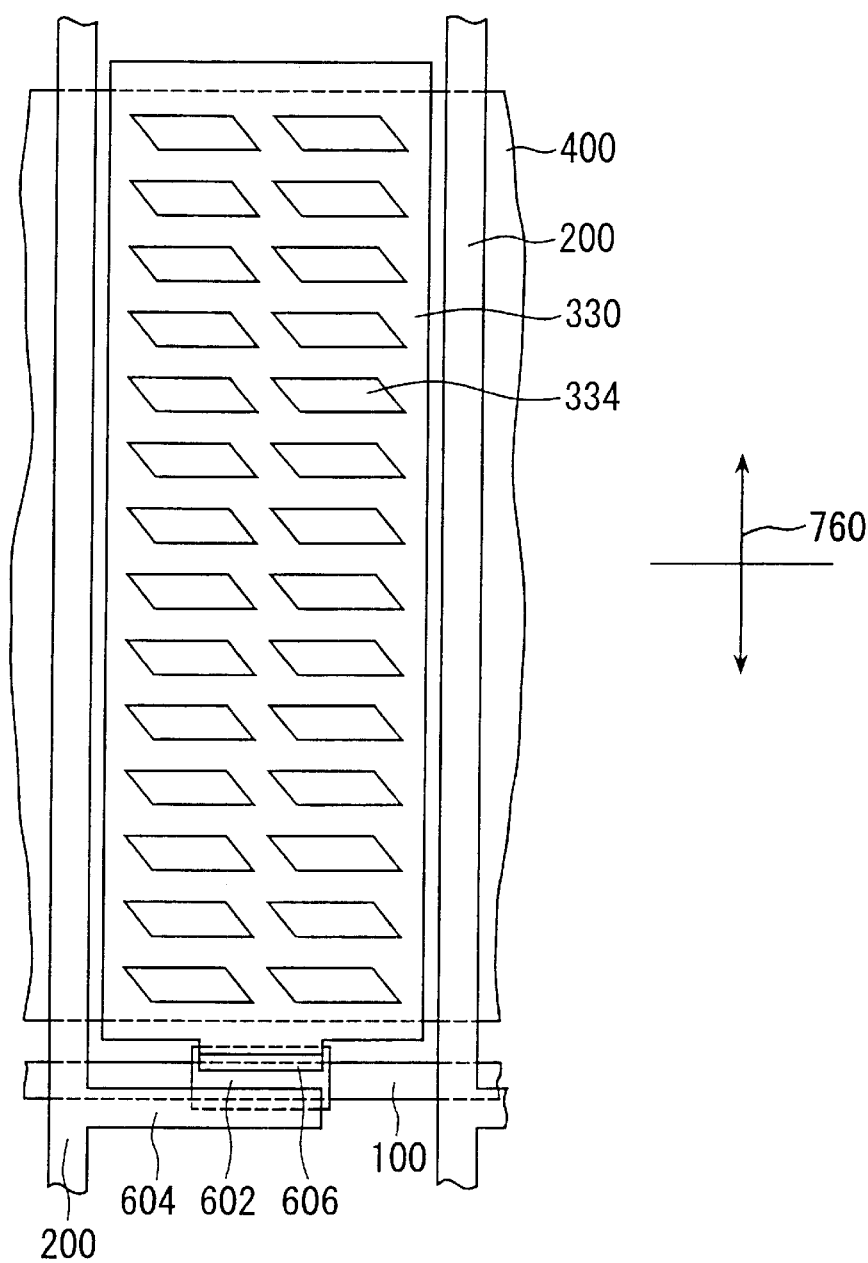
FIG. 17 is a partial front view showing a structure of a liquid crystal display panel of a liquid crystal display according to a sixth embodiment of the present invention.

FIG. 17 shows a liquid crystal display according to the sixth embodiment of the present invention. The liquid crystal display according to the sixth embodiment is a variation of the above-mentioned liquid crystal display according to the first embodiment. Therefore, in FIG. 17, components similar to those of the first embodiment are designated by the corresponding reference numerals used in FIG. 1 through FIG. 3, and description thereof is omitted here.

As apparent from FIG. 17, the liquid crystal display according to this embodiment has a characteristic shape of each pixel electrode 330.

The pixel electrode 330 shown in the drawing has a plurality of parallelogram shaped opening portions 334. More particularly, the parallelogram shapes of the opening portions 334 have short sides extending in the same direction for all opening portions 334 and long sides extending in the same direction for all opening portions 334. As shown in FIG. 17, the long-sides of the parallelogram shapes extend in the right and left direction of the liquid crystal display panel. The short sides of the parallelogram shapes extent in a direction having a predetermined angle to the up and down direction of the liquid crystal display panel.

In this embodiment, the initial alignment direction of liquid crystal molecules is determined to be a direction perpendicular to the direction of the long sides of the parallelogram shape of the opening portions 334, as shown by a reference numeral 760 in FIG. 17.

The principle of operation, advantageous effects and the like of the liquid crystal display according to this embodiment are approximately the same as those of the first embodiment, and explanation thereof is omitted here.

In the structure of FIG. 17, an auxiliary conductive portion 700 is not provided. However, it is possible to use such auxiliary conductive portion 700 and, in addition to this, to divide the first common electrode into separate common electrode portions corresponding to respective pixel areas as in the fourth embodiment mentioned above. Also, the first common electrode 400 shown in FIG. 17 does not have common electrode side opening portions. However, it is possible to provide such common electrode side opening portions, as long as non-opening portions of the pixel electrode 320 and the first common electrode 400 overlap each other at end portions in the width direction of the non-opening portions, in a manner similar to the third embodiment.

[Embodiment 7]

Figure 18:
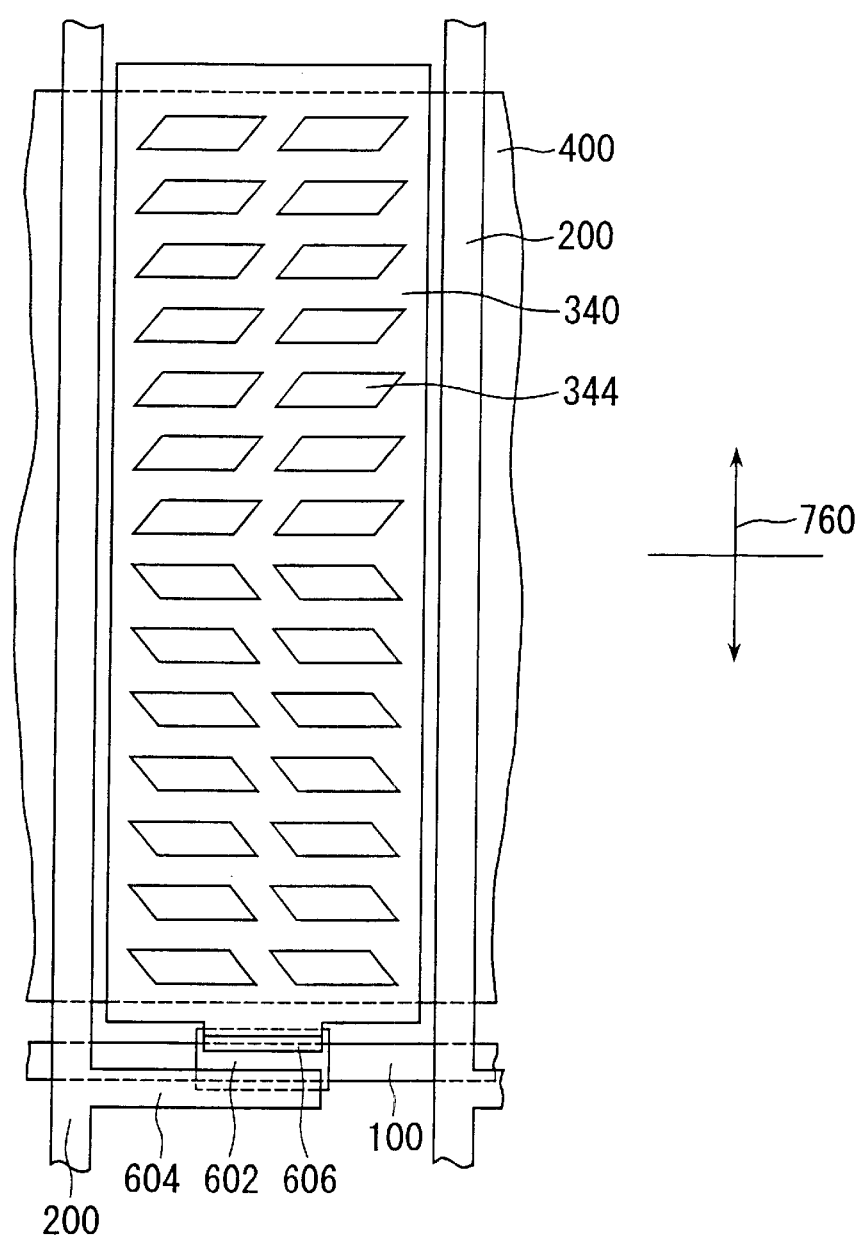
FIG. 18 is a partial front view showing a structure of a liquid crystal display panel of a liquid crystal display according to a seventh embodiment of the present invention.

FIG. 18 shows a liquid crystal display according to the seventh embodiment of the present invention. The liquid crystal display according to the seventh embodiment is a variation of the above-mentioned liquid crystal display according to the sixth embodiment mentioned above.

As apparent from FIG. 18, the liquid crystal display according to this embodiment has a characteristic shape of each pixel electrode 340.

The pixel electrode 340 shown in the drawing has a plurality of parallelogram shaped opening portions 344. More particularly, these plurality of opening portions 344 are grouped into two groups of those in an upper side area and in a lower side area of the pixel area. Long sides of the parallelograms of the opening portions 344 of both groups extend in the same direction, that is, right and left direction of the liquid crystal display panel. However, short sides of the parallelograms of the opening portions 344 of the upper side groups and of the lower side groups are disposed symmetrically with respect to the center line of the pixel electrode 340 which is parallel to the gate wiring 100.

In this embodiment, the initial alignment direction of liquid crystal molecules is determined to be a direction perpendicular to the direction of the gate wiring 100, as shown by a reference numeral 760 in FIG. 18.

By using the pixel electrodes 340 each having the above-mentioned shape, and by determining the initial alignment direction of liquid crystal molecules as shown in the drawing, the liquid crystal molecules rotates toward different directions which are different from each other in upper half and lower half portions of the pixel area, when an image signal is written into the pixel electrode 340.

Therefore, in this embodiment, it is possible to obtain superior display characteristics. More particularly, the areas having different rotational directions of liquid crystal molecules have mutually different viewing angle characteristics. Since the areas having such different viewing angle characteristics are provided in each one pixel, the viewing angle characteristics are mutually compensated, so that variation of display characteristics when the viewing angle is changed can be suppressed and superior display characteristics can be obtained.

In the structure of FIG. 18, an auxiliary conductive portion 700 is not provided. However, it is possible to use such auxiliary conductive portion 700 and, in addition to this, to divide the first common electrode into separate common electrode portions corresponding to respective pixel areas as in the fourth embodiment mentioned above. Also, the first common electrode 400 shown in FIG. 18 does not have common electrode side opening portions. However, it is possible to provide such common electrode side opening portions, as long as non-opening portions of the pixel electrode 320 and the first common electrode 400 overlap each other at end portions in the width direction of the non-opening portions, in a manner similar to the third embodiment.

As mentioned above, according to the present invention, novel means is utilized which produces an electric field for driving liquid crystal molecules and, therefore, it is possible to obviate various problems of the conventional liquid crystal displays.

In particular, it is possible to prevent the electric field for driving liquid crystal molecules from affecting an inside portion of the opposing substrate and various layers such as the CF layer formed thereon and the like. Also, the liquid crystal display according to the present invention can be easily manufactured, and can be easily controlled when driving such liquid crystal display. Further, since a relatively strong electric field can be produced in the vicinity of each of the opening portions of each pixel electrode, it is possible to perform stable and reliable control of the rotational direction of the liquid crystal molecules.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A liquid crystal display having a first substrate, a second substrate parallel opposed to said first substrate, and a liquid crystal layer including liquid crystal molecules, wherein display operation is performed by changing a director of said liquid crystal molecules mainly in a plane parallel to said first and second substrate, said liquid crystal display comprising:
   a first common electrode which is disposed on the side of said first substrate and which receives a first predetermined potential;
   an insulating layer formed on said first common electrode;
   at least one pixel electrodes each of which is formed on said insulating layer and has a plurality of opening portions;
   a second common electrode which is disposed on the side of said second substrate and which receives a second predetermined potential;
   wherein said liquid crystal molecules have a negative anisotropy of permittivity; and
   wherein said first common electrode comprises at least a particular portion formed in a particular area which extends from a non-opening portion to an opening portion of said pixel electrode and in which said first common electrode overlaps said non-opening portion in a cross section perpendicular to said substrates.

2. A liquid crystal display as set forth in claim 1, wherein said first common electrode is formed on said first substrate, and wherein said particular portion of said first common electrode has, in a cross section perpendicular to said substrates, a shape which covers whole area corresponding to said plurality of opening portions on said first substrate.

3. A liquid crystal display as set forth in claim 1, wherein said first common electrode comprises, in a cross section perpendicular to said substrates, common electrode side opening portions in an area which overlaps with said non-opening portion of said first substrate.

4. A liquid crystal display as set forth in claim 1, wherein said first common electrode is formed on said first substrate, and has a shape which covers said first substrate every pixel.

5. A liquid crystal display as set forth in claim 1, wherein said second common electrode is formed on whole area of said second substrate.

6. A liquid crystal display as set forth in claim 1, wherein a portion of said first common electrode corresponding to one pixel is directly coupled with a portion of said first common electrode corresponding to anther pixel which is adjacent to said one pixel in a predetermined direction.

7. A liquid crystal display as set forth in claim 1, further comprising an auxiliary conductive portion which is formed of a conductive material having lower resistivity than that of a conductive material forming said first common electrode and which is coupled with said first common electrode.

8. A liquid crystal display as set forth in claim 7, wherein said liquid crystal display is an active matrix type liquid crystal display which comprises a switching element for each pixel.

9. A liquid crystal display as set forth in claim 8, wherein said switching element is a thin film transistor.

10. A liquid crystal display as set forth in claim 9, wherein said auxiliary conductive portion is formed in the same layer as that of the gate electrode of said thin film transistor.

11. A liquid crystal display as set forth in claim 10, wherein said auxiliary conductive portion is formed by patterning an electrode material of said gate electrode, in the same process step as that of said gate electrode.

12. A liquid crystal display as set forth in claim 1, further comprising: a plurality of auxiliary conductive portions each of which is formed of a conductive material having lower resistivity than that of a conductive material forming said first common electrode;
   wherein said first common electrode is constituted of first common electrode portions each of which is provided for a pixel; and
   wherein each of said auxiliary conductive portions couples said first common electrode portions which are adjacent with each other in a predetermined direction.

13. A liquid crystal display as set forth in claim 1, wherein said first predetermined potential and said second predetermined potential are mutually equal potential.

14. A liquid crystal display as set forth in claim 13, wherein said first substrate, said second substrate and said liquid crystal layer compose a liquid crystal display panel; and
   wherein said first common electrode and said second common electrode are coupled with each other at a peripheral portion of said liquid crystal display panel.

15. A liquid crystal display as set forth in claim 14, further comprising a potential adjusting means which adjust said first predetermined potential and said second predetermined potential applied to said first and second common electrodes.

16. A liquid crystal display as set forth in claim 1, wherein said second common electrode is formed of a transparent electrode material; and
   wherein at least one of said pixel electrodes and said first common electrode is also formed of a transparent electrode material.

17. A liquid crystal display as set forth in claim 1, wherein each of said plurality of opening portions of said pixel electrode has a parallelogram shape; and
   wherein an angle between a direction along short sides of said parallelogram and a direction along long sides of said parallelogram is smaller than an angle between the alignment direction of said liquid crystal molecules and said direction along long sides of said parallelogram.

18. A liquid crystal display as set forth in claim 1, wherein each of said plurality of opening portions of said pixel electrode has a parallelogram shape; and
   wherein the alignment direction of said liquid crystal molecules is determined to be a direction perpendicular to a direction of long sides of said parallelogram.

19. A liquid crystal display as set forth in claim 18, wherein said plurality of opening portions are grouped into two groups; and
   wherein, in said plurality of opening portions of said two groups, long sides of parallelogram shapes of said opening portions of both groups extend in the same direction, and short sides thereof are disposed symmetrically with respect to a line having a direction perpendicular to the direction of said long sides.

20. A liquid crystal display as set forth in claim 1, wherein each of said plurality of opening portions of said pixel electrode has a V-shape having short sides located along the alignment direction of said liquid crystal molecules and composed by combining two parallelograms which share a short side with each other and whose long sides are disposed symmetrically with respect to said alignment direction.

21. A liquid crystal display as set forth in claim 1, further comprising: a color layer for realizing color display on the side of said second substrate; and
   wherein said color layer is formed as a layer which is farther from said liquid crystal layer than said second common electrode.

22. A liquid crystal display having a first substrate, a second substrate opposed to said first substrate, and a liquid crystal layer including liquid crystal molecules, wherein display operation is performed by changing a director of said liquid crystal molecules mainly in a plane parallel to said first or second substrate, said liquid crystal display comprising:

- a first common electrode which is disposed on the side of said first substrate and which receives a first predetermined potential;
- an insulating film formed on said first common electrode;
- at least one pixel electrodes each of which is formed on said insulating film and has a plurality of opening portions;
- a second common electrode which is disposed on the side of said second substrate and which receives a second predetermined potential;
- wherein said liquid crystal molecules have negative anisotropy of permittivity; and
- wherein when a drive potential is applied to said pixel electrode to drive a pixel having said pixel electrode, said first common electrode together with said pixel electrode produce a first electric field including a first component which is perpendicular to said substrates, and said second common electrode together with said pixel electrode produce a second electric field including a second component which is perpendicular to said substrates and which has a direction opposite to that of said first component, said first and second electric fields are superposed to produce an electric field which drive said liquid crystal molecules in a plane parallel to said substrates.

23. In a liquid crystal display having a first substrate, a second substrate opposed to said first substrate, and a liquid crystal layer including liquid crystal molecules, wherein display operation is performed by changing a director of said liquid crystal molecules mainly in a plane parallel to said first or second substrate, a method of performing display operation comprising:

- forming a first common electrode on the side of said first substrate;
- forming an insulating film on said first common electrode;
- forming at least one pixel electrodes on said insulating film, each of said at least one pixel having a plurality of opening portions;
- forming a second common electrode on the side of said second substrate;
- forming an liquid crystal display panel of said liquid crystal display by using liquid crystal molecules have a negative anisotropy of permittivity;
- applying a first predetermined potential to said first common electrode such that when a drive potential is applied to said pixel electrode to drive a pixel having said pixel electrode, said first common electrode together with said pixel electrode produce a first electric field including a first component which is perpendicular to said substrates;
- applying a second predetermined potential to said second common electrode such that when a drive potential is applied to said pixel electrode to drive a pixel having said pixel electrode, said second common electrode together with said pixel electrode produce a second electric field including a second component which is perpendicular to said substrates and which has a direction opposite to that of said first component; and
- superposing said first and second electric fields in said liquid crystal layer, wherein, by using viscoelasticity of liquid crystal molecules, a component of operation in a direction perpendicular to said substrates in an operation in which liquid crystal molecules near said first substrate liable to be influenced by said first electric field are going to rotate in a plane horizontal with said substrate and are going to form a first predetermined tilt angle in a direction perpendicular to said substrates, and a component of operation in a direction perpendicular to said substrates in an operation in which liquid crystal molecules near said second substrate liable to be influenced by said second electric field are going to rotate in a plane horizontal with said substrate and are going to form a second predetermined tilt angle in a direction perpendicular to said substrates, said second predetermined tilt angle being opposite in direction to said first predetermined tilt angle, are influenced and restrained by each other, thereby rotating said liquid crystal molecules a plane parallel to said substrates.

24. A method of performing display operation as set forth in claim 23, wherein a portion of said first common electrode corresponding to one pixel is directly coupled with a portion of said first common electrode corresponding to anther pixel which is adjacent to said one pixel in a predetermined direction.

25. A method of performing display operation as set forth in claim 23, further comprising forming a plurality of auxiliary conductive portions each of which is formed of a conductive material having lower resistivity than that of a conductive material forming said first common electrode;

- wherein said first common electrode is constituted of first common electrode portions each of which is provided for a pixel; and
- wherein each of said auxiliary conductive portions couples said first common electrode portions which are adjacent with each other in a predetermined direction.

* * * * *